United States Patent
Iizuka et al.

(10) Patent No.: US 9,889,412 B2
(45) Date of Patent: Feb. 13, 2018

(54) COMPOSITE GAS SEPARATION MEMBRANE, GAS SEPARATION MODULE, GAS SEPARATION APPARATUS AND GAS SEPARATION METHOD

(71) Applicant: FUJIFILM Corporation, Tokyo (JP)

(72) Inventors: Yuusuke Iizuka, Ashigarakami-gun (JP); Satoshi Sano, Ashigarakami-gun (JP); Koji Hironaka, Ashigarakami-gun (JP); Takeshi Narita, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/063,768

(22) Filed: Mar. 8, 2016

(65) Prior Publication Data

US 2016/0184779 A1 Jun. 30, 2016

Related U.S. Application Data

(63) Continuation of application No. PCT/JP2014/071669, filed on Aug. 19, 2014.

(30) Foreign Application Priority Data

Sep. 9, 2013 (JP) .................. 2013-186104

(51) Int. Cl.
*B01D 53/22* (2006.01)
*B01D 71/64* (2006.01)
(Continued)

(52) U.S. Cl.
CPC .......... *B01D 71/64* (2013.01); *B01D 53/228* (2013.01); *B01D 69/10* (2013.01); *B01D 69/12* (2013.01);
(Continued)

(58) Field of Classification Search
CPC ...... B01D 53/228; B01D 69/12; B01D 71/64; B01D 2257/504; C08G 73/1067
See application file for complete search history.

(56) References Cited

U.S. PATENT DOCUMENTS 5,112,941 A * 5/1992 Kasai .................. B01D 71/64
528/128
5,198,316 A * 3/1993 Wernet .................. B01D 71/64
210/651
(Continued)

FOREIGN PATENT DOCUMENTS

JP 57-63101 A 4/1982
JP 9-898 A 1/1997
(Continued)

OTHER PUBLICATIONS

English language machine translation for JP 2000-288371. Retrieved from http://translationportal.epo.org on Apr. 27, 2017.*
(Continued)

*Primary Examiner* — Jason M Greene
(74) *Attorney, Agent, or Firm* — Birch, Stewart, Kolasch & Birch, LLP

(57) ABSTRACT

There is provided a composite gas separation membrane including a gas separation layer, which is formed to include
(Continued)

a polyimide resin, on a support layer having gas permeability, in which the polyimide resin includes a repeating unit represented by the following Formula (I)

Formula (I)

in Formula (I), X represents a group having a specific structure represented by any of the following Formulae (I-a) to (I-h), (I-a)
(I-b)
(I-c)
(I-d)
(I-e)
(I-f)
(I-g)
(I-h)

in Formula (I), $Y^1$ represents a group represented by the following Formula (II-a) or (II-b), and Formula (II-a)

Formula (II-b)

in Formulae (II-a) and (II-b), $R^3$ represents a substituent group, A represents a dissociable group, p represents 0 or 1, p1 represents an integer of 0 to 2, and p2 represents an integer of 2 or greater.

9 Claims, 1 Drawing Sheet

(51) Int. Cl.
   *B01D 69/12*  (2006.01)
   *B01D 69/10*  (2006.01)
   *B01D 71/42*  (2006.01)
(52) U.S. Cl.
   CPC ........ *B01D 71/42* (2013.01); *B01D 2256/245* (2013.01); *B01D 2257/504* (2013.01); *B01D 2325/20* (2013.01); *Y02C 10/10* (2013.01)

(56) References Cited

U.S. PATENT DOCUMENTS

| | | | |
|---|---|---|---|
| 5,618,334 A * | 4/1997 | Ozcayir | B01D 71/64 210/500.39 |
| 5,817,165 A | 10/1998 | Hachisuka et al. | |
| 5,928,410 A * | 7/1999 | Jois | B01D 71/64 55/DIG. 5 |
| 2009/0282982 A1 | 11/2009 | Jung et al. | |
| 2010/0242723 A1 | 9/2010 | Liu et al. | |
| 2014/0130667 A1 | 5/2014 | Sano et al. | |
| 2015/0000519 A1 * | 1/2015 | Liu | B01D 71/64 95/45 |

FOREIGN PATENT DOCUMENTS

| | | | |
|---|---|---|---|
| JP | 10-168188 A | 6/1998 | |
| JP | 2000-288371 | * 10/2000 | ............. B01D 71/64 |
| JP | 2000-288371 A | 10/2000 | |
| JP | 2007-297605 A | 11/2007 | |
| JP | 2011-52064 A | 3/2011 | |
| JP | 2011-523589 A | 8/2011 | |
| JP | 2012-521870 A | 9/2012 | |
| JP | 2013-46904 A | 3/2013 | |

OTHER PUBLICATIONS

International Search Report for PCT/JP2014/071669 (PCT/ISA/210) dated Nov. 11, 2014.
Kim et al. "C02 separation performances of composite membranes of 6FDA-based polyimides with a polar group", Journal of Membrane Science, 2003, vol. 211, pp. 41-49.

(56) References Cited

OTHER PUBLICATIONS

Written Opinion of the International Searching Authority for PCT/JP2014/071669 (PCT/ISA/237) dated Nov. 11, 2014.

* cited by examiner

COMPOSITE GAS SEPARATION MEMBRANE, GAS SEPARATION MODULE, GAS SEPARATION APPARATUS AND GAS SEPARATION METHOD

CROSS-REFERENCE TO RELATED APPLICATIONS

This application is a Continuation of PCT International Application No. PCT/JP2014/071669 filed on Aug. 19, 2014, which claims priority under 35 U.S.C. § 119 (a) to Japanese Patent Application No. 2013-186104 filed on Sep. 9, 2013. Each of the above applications is hereby expressly incorporated by reference, in its entirety, into the present application.

BACKGROUND OF THE INVENTION

1. Field of the Invention

The present invention relates to a composite gas separation membrane, a gas separation module, a gas separation apparatus, and a gas separation method.

2. Description of the Related Art

A material formed of a polymer compound has gas permeability specific to the material. Based on this property, it is possible to cause selective permeation and separation out of a target gas component using a membrane formed of a specific polymer compound. As an industrial use aspect for this gas separation membrane related to the problem of global warming, separation and recovery from large-scale carbon dioxide sources with this gas separation membrane has been examined in thermal power plants, cement plants, or ironworks blast furnaces. Further, this membrane separation technique has been attracting attention as a means for solving environmental issues which can be achieved with relatively little energy. In addition, natural gas or biogas (from biological excrement, organic fertilizers, biodegradable substances, sewage, garbage, fermented agricultural crops, or gas generated due to anaerobic digestion) is mixed gas mainly containing methane and carbon dioxide, and a membrane separation method is being examined as a means for removing impurities contained in the carbon dioxide and the like (JP2007-297605A).

When natural gas is purified using the membrane separation method, excellent gas permeability and separation selectivity are required in order to efficiently perform separation and purification of gas. Various membrane materials have been examined in order to realize excellent gas permeability and separation selectivity, and a gas separation membrane using a polyimide resin has been examined as a means therefor. For example, Journal of Membrane Science (2003, 211, p 41 to 49) discloses that separation selectivity of a gas separation membrane is improved when a polyimide resin to which a polar group such as a carboxy group or a hydroxyl group is introduced is used.

In order to obtain a practical gas separation membrane, it is necessary to ensure sufficient gas permeability by making a gas separation layer thinner and sufficient gas separation selectivity is further required. A method of making a portion contributing to separation into a thin layer referred to as a dense layer or a skin layer by forming a polymer compound such as a polyimide resin into an asymmetric membrane using a phase separation method is known as a technique of forming a gas separation layer into a thin layer (for example, see U.S. Pat. No. 5,928,410).

SUMMARY OF THE INVENTION

The gas separation membrane described in Journal of Membrane Science (2003, 211, p 41 to 49) is configured such that 6FDA (4,4'-(hexatluoroisopropylidene)diphthalic anhydride) is used as a tetracarboxylic dianhydride and DABA (3,5-diaminobenzoic acid) is used as a diamine. However, the gas separation membrane has problems in practical use since the membrane is used under high pressure conditions and gas separation selectivity tends to be degraded due to the influence of impurities such as benzene, toluene, and xylene (hereinafter referred to as BTX) which are present in actual system gas.

Further, a portion other than a dense layer is allowed to function as a support layer providing mechanical strength for a membrane in an asymmetric membrane described in Journal of Membrane Science (2003, 211, p 41 to 49). However, since it is necessary to realize all of high gas permeability, separation selectivity, and mechanical strength using only one material, the performance is limited.

An object of the present invention is to provide a composite gas separation membrane which achieves both of high gas permeability and gas separation selectivity, in which performance is less likely to be degraded due to impurities such as BTX, which are present in natural gas, and which has a mechanical strength which can withstand high pressure conditions. Further, another object of the present invention is to provide a gas separation module, a gas separation apparatus, and a gas separation method using the above-described composite gas separation membrane.

The present inventors conducted intensive research to solve the above-described problems. As a result, they found that, when a thin membrane formed of a polyimide resin obtained by polymerizing a specific tetracarboxylic dianhydride and a diamine having a plurality of specific dissociable groups is formed on a support layer having gas permeability to obtain a composite membrane and then the composite membrane is used as a gas separation membrane, both of gas permeability and gas separation selectivity of the gas separation layer formed of the polyimide resin are excellent and a composite gas separation membrane showing excellent resistance to impurities can be obtained. The present invention has been realized based on this knowledge.

According to the present invention, the following means is provided.

<1> A composite gas separation membrane including: a gas separation layer, which is formed to include a polyimide resin, on a support layer having gas permeability, in which the polyimide resin includes a repeating unit represented by the following Formula (I).

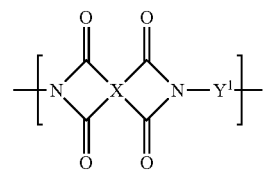

Formula (I)

In Formula (I), X represents a group having a structure represented by any of the following Formulae (I-a) to (I-h), $X^1$ represents a single bond or a divalent linking group, L represents —CH=CH— or —$CH_2$—, $R^1$ and $R^2$ represent a hydrogen atom or a substituent group, and the symbol "*" represents a binding site with respect to a carbonyl group in Formula (I).

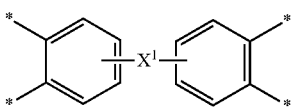
(I-a)

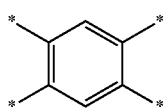
(I-b)

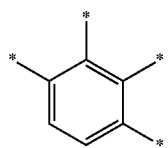
(I-c)

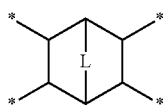
(I-d)

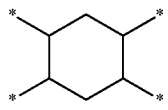
(I-e)

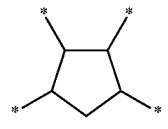
(I-f)

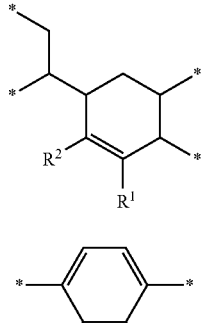
(I-g)

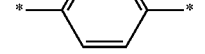
(I-h)

In Formula (I), $Y^1$ represents a group having a structure represented by the following Formula (II-a) or (II-b).

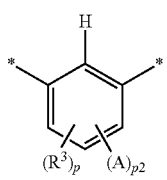

Formula (II-a)

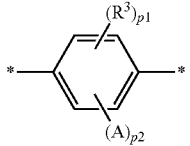

Formula (II-b)

In Formulae (II-a) and (II-b), $R^3$ represents a substituent group, A represents a dissociable group, p represents 0 or 1, p1 represents an integer of 0 to 2, p2 represents an integer of 2 or greater, and the symbol "*" represents a connection site.

<2> The composite gas separation membrane according to <1>, in which the polyimide resin includes a repeating unit represented by the following Formula (III).

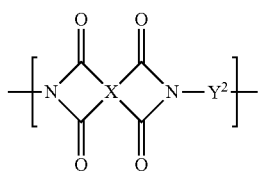

Formula (III)

In Formula (III), X has the same definition as that for X in Formula (I), and $Y^2$ represents a group having a structure represented by the following Formula (IV-a) or (IV-b).

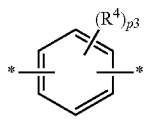

Formula (IV-a)

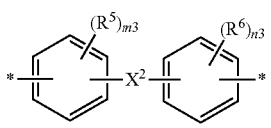

Formula (IV-b)

In Formula (IV-a) or (IV-b), $R^4$ represents an alkyl group or a halogen atom, $R^5$ and $R^6$ represent an alkyl group, a halogen atom, or a group that forms a ring together with $X^2$ by $R^5$ and $R^6$ being linked to each other, p3, m3, and n3 represent an integer of 0 to 4, $X^2$ represents a single bond or a divalent linking group, and the symbol "*" represents a connection site.

<3> The composite gas separation membrane according to <2>, in which the number of moles of the repeating unit represented by Formula (I) is greater than the number of moles of the repeating unit represented by Formula (III) in the polyimide resin.

<4> The composite gas separation membrane according to any one of <1> to <3>, in which $Y^1$ is represented by Formula (II-b).

<5> The composite gas separation membrane according to any one of <1> to <4>, wherein the polyimide resin includes a repeating unit represented by the following Formula (V).

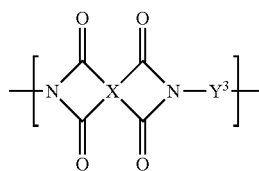

Formula (V)

In Formula (V), X has the same definition as that for X in Formula (I), and $Y^3$ represents a group having a structure represented by the following Formula (VI).

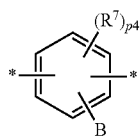

Formula (VI)

In Formula (VI), $R^7$ represents a substituent group, B represents a dissociable group, p4 represents an integer of 0 to 3, and the symbol "*" represents a connection site.

<6> The composite gas separation membrane according to any one of <1> to <5>, in which, when gas subjected to a separation treatment is mixed gas of carbon dioxide and methane, the permeation rate of carbon dioxide at 40° C. and 40 atm is greater than 20 GPU, and the ratio between permeation rates of carbon dioxide and methane($R_{CO2}$/$R_{CH4}$) is 15 or greater.

<7> The composite gas separation membrane according to any one of <1> to <6>, in which the support layer is formed of a porous layer on a gas separation layer side and a non-woven fabric layer on a side opposite to the gas separation layer.

<8> The composite gas separation membrane according to any one of <1> to <7>, in which the cut-off molecular weight of the porous layer is 100,000 or less.

<9> The composite gas separation membrane according to any one of <1> to <8>, which is used to allow selective permeation of carbon dioxide from gas containing carbon dioxide and methane.

<10> A gas separation module including the composite gas separation membrane according to any one of <1> to <9>.

<11> A gas separation apparatus including the gas separation module according to <10>.

<12> A gas separation method including: allowing carbon dioxide to selectively permeate from gas containing carbon dioxide and methane using the composite gas separation membrane according to any one of <1> to <9>.

In the present specification, when a plurality of substituent groups or linking groups (hereinafter, referred to as substituent groups or the like) shown by specific symbols are present or a plurality of substituent groups are defined simultaneously or alternatively, this means that the respective substituent groups may be the same as or different from each other. The same applies to the definition of the number of substituent groups or the like. Moreover, when there is a repetition of a plurality of partial structures shown by means of the same display in the formula, the respective partial structures or repeating units may be the same as or different from each other. In addition, even if not specifically stated, when a plurality of substituent groups or the like are adjacent to each other, it means that they may be condensed or linked to each other and form a ring.

In regard to compounds (including resins) described in the present specification, the description includes salts thereof and ions thereof in addition to the compounds. Further, the description includes derivatives formed by changing a part of the structure within the range in which target effects are exhibited.

A substituent group (the same applies to a linking group) in which substitution or non-substitution is not specified in the present specification may include an optional substituent group within the range in which target effects are exhibited. The same applies to a compound in which substitution or non-substitution is not specified.

A preferable range of a substituent group Z described below is set as a preferable range of a substituent group in the present specification unless otherwise specified.

The composite gas separation membrane, the gas separation module, and the gas separation apparatus of the present invention have excellent gas permeability and high gas separation performance. In addition, the composite gas separation membrane, the gas separation module, and the gas separation apparatus have a mechanical strength which can withstand high pressure conditions and degradation of gas separation performance is unlikely to occur when used for separation of gases containing impurities such as BTX.

According to the gas separation method of the present invention, it is possible to separate gas with higher permeability and higher selectivity. In addition, even when impurities such as BTX are present in the gas, it is possible to continuously separate gas with high gas permeability and excellent gas separation. Further, it is possible to continuously separate gas even under high pressure conditions with high gas permeability and gas separation performance.

The above-described and other features and the above-described and other advantages of the present invention will become apparent with reference to the description below and the accompanying drawings.

DESCRIPTION OF THE PREFERRED EMBODIMENTS

Figure 1:
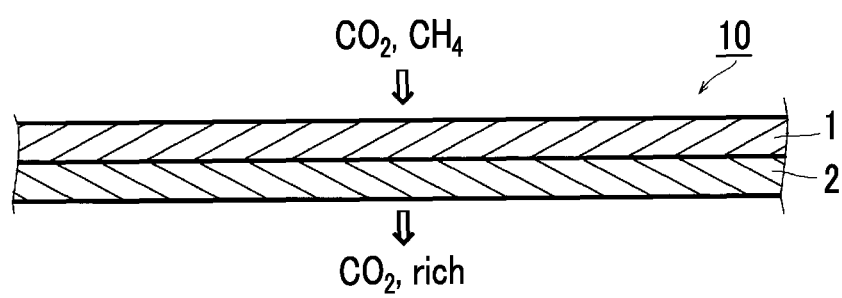
FIG. 1 is a sectional view schematically illustrating an embodiment of a composite gas separation membrane of the present invention.

Hereinafter, the present invention will be described in detail.

In a composite gas separation membrane of the present invention, a gas separation membrane includes a specific polyimide resin.

[Polyimide Resin]

The polyimide resin used in the present invention includes at least a repeating unit represented by the following Formula (I).

Formula (I)

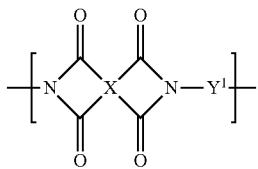

In Formula (I), X represents a group having a structure represented by any of the following Formulae (I-a) to (I-h). In the following Formulae (I-a) to (I-h), the symbol "*" represents a binding site with respect to a carbonyl group represented by Formula (I). X in Formula (I) is referred to as a mother nucleus in some cases. The mother nucleus X is preferably a group represented by Formulae (I-a), (I-b), or (I-d), more preferably a group represented by Formula (I-a) or (I-d), and particularly preferably a group represented by Formula (I-a).

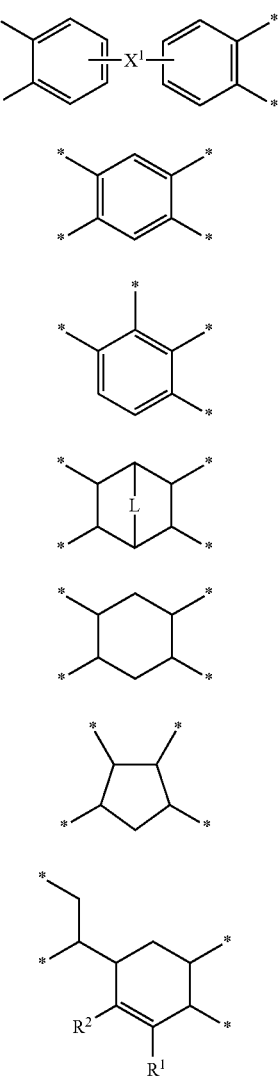

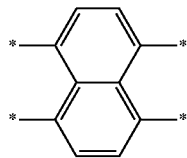

In Formula (I-a), $X^1$ represents a single bond or a divalent linking group. As the divalent linking group, —C($R^x$)$_2$— ($R^x$ represents a hydrogen atom or a substituent group, when $R^x$ represents a substituent group, $R^x$'s may be linked to each other and form a ring), —O—, —SO$_2$—, —C(=O)—, —S—, —NR$^Y$— (R$^Y$ represents a hydrogen atom, an alkyl group (preferably a methyl group or an ethyl group), an aryl group (preferably a phenyl group)), or a combination of these is preferable and a single bond or —C($R^x$)$_2$— is more preferable. When $R^x$ represents a substituent group, a group Z of substituent groups described below is specifically exemplified. Among these, an alkyl group (the preferable range is the same as that of the alkyl group in the group Z of substituent groups described below) is preferable, an alkyl group having a halogen atom as a substituent group is more preferable, and trifluoromethyl is particularly preferable. Further, in regard to the expression "may be linked to each other and form a ring" in the present specification, the linkage may be made by a single bond or a double bond and a cyclic structure may be formed or condensation may be made and a condensed ring structure may be formed.

In Formula (I-d), L represents —CH=CH— or —CH$_2$— and —CH=CH— is preferable.

In Formula (I-g), $R^1$ and $R^2$ represent a hydrogen atom or a substituent group. Examples of the substituent group include groups shown as examples of the group Z of substituent groups described below. $R^1$ and $R^2$ may be bonded to each other and form a ring.

$R^1$ and $R^2$ preferably represent a hydrogen atom or an alkyl group, more preferably represent a hydrogen atom, a methyl group, or an ethyl group, and still more preferably represent a hydrogen atom.

In Formula (I), Y1 represents a group having a structure represented by the following Formula (II-a) or (II-b).

Formula (II-a)

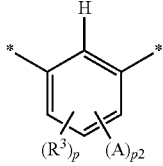

Formula (II-b)

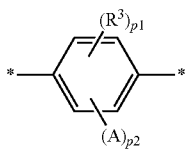

In Formulae (II-a) and (II-b), $R^3$ represents a substituent group. Examples of the substituent group include groups shown as examples of the group Z of substituent groups described below. Among these, $R^3$ preferably represents an alkyl group (the number of carbon atoms of the alkyl group is preferably in a range of 1 to 20, more preferably in a range of 1 to 10, and still more preferably in a range of 1 to 5, the alkyl group may include a heteroatom (preferably an oxygen atom or a sulfur atom) in a chain thereof, and preferred examples thereof include a methyl group, an ethyl group, a n-propyl group, an iso-propyl group, a tert-butyl group, and a trifluoromethyl group), a halogen atom (examples thereof include a fluorine atom, a chlorine atom, a bromine atom, and an iodine atom, and a fluorine atom is more preferable), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), or an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl) and more preferably represents an alkyl group or a halogen atom.

p showing the number of $R^3$'s in Formula (II-a) represents 0 or 1 and 0 is more preferable. p1 showing the number of $R^3$'s in Formula (II-b) represents an integer of 0 to 2, and p1 represents preferably 0 or 1 and more preferably 0.

In Formulae (II-a) and (II-b), A represents a dissociable group.

The dissociable group in the present specification means a group which includes a hydrogen atom and in which the hydrogen atom is dissociated by an action of a base. Specific examples of the dissociable group include a hydroxy group, a mercapto group, a carboxy group, a sulfo group, and a phosphor acid group. Among these, a hydroxy group, a mercapto group, or a carboxy group is preferable.

p2 showing the number of A's represents an integer of 2 or greater. p2 in Formula (II-a) represents 2 or 3 and 2 is preferable. p2 in Formula (II-b) represents an integer of 2 to 4, and 2 or 3 is preferable and 2 is more preferable.

The symbol "*" represents a connection site.

Further, it is preferable that $Y^1$ in Formula (I) is represented by Formula (II-b). In this case, from a viewpoint of improving gas permeability and separation selectivity, the ratio of a repeating unit represented by Formula (II-b) is preferably 35% by mole or greater, more preferably 38% by mole or greater, and still more preferably 40% by mole or greater with respect to total diamine components (total repeating units derived from diamine) in a polyimide resin.

It is obvious that a terminal group of a polyimide resin which is used in the present invention and includes a repeating unit represented by Formula (I), (III), or (V) is determined using a synthetic method and a reaction material described below. Examples of the terminal group include a hydrogen atom, a carboxy group, and an amino group. Further, the terminal group may be substituted by performing capping. In this case, examples of the terminal group include an aryl group and a heteroaryl group.

It is preferable that the polyimide resin used in the present invention includes a repeating unit represented by the following Formula (III) in addition to a repeating unit represented by Formula (I).

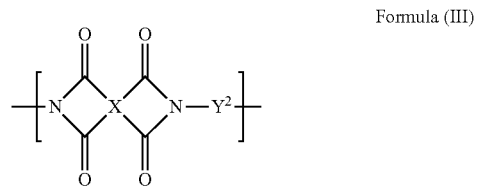

Formula (III)

In formula (III), X has the same definition as that for X in Formula (I) and the preferable range is the same as that of X in Formula (I). $Y^2$ represents a group having a structure represented by the following Formula (IV-a) or (IV-b).

Formula (IV-a)

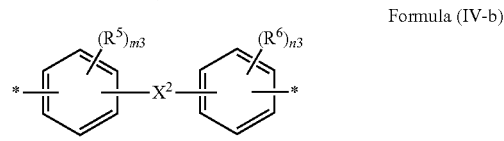

Formula (IV-b)

In Formulae (IV-a) and (IV-b), $R^4$ represents an alkyl group or a halogen atom. $R^5$ and $R^6$ represent an alkyl group, a halogen atom, or a group that forms a ring together with $X^2$ by $R^5$ and $R^6$ being linked to each other.

p3 showing the number of $R^4$'s represents an integer of 0 to 4. p3 represents preferably 1 to 4, more preferably 2 to 4, and still more preferably 3 or 4. In a case where $R^4$ represents an alkyl group, the number of carbon atoms of the alkyl group is preferably in a range of 1 to 10, more preferably in a range of 1 to 5, and still more preferably in a range of 1 to 3, and methyl, ethyl, or trifluoromethyl is more preferable.

A structure in which $R^5$ is linked to $R^6$ is not particularly limited, and a single bond, —O—, or —S— is preferable. m3 and n3 respectively showing the number of $R^5$'s and the number of $R^6$'s represent an integer of 0 to 4. m3 and n3 preferably represent 1 to 4, more preferably represent 2 to 4, and still more preferably represent 3 or 4. In a case where $R^5$ and $R^6$ represent an alkyl group, the number of carbon atoms of the alkyl group is preferably in a range of 1 to 10, more preferably in a range of 1 to 5, and still more preferably in a range of 1 to 3, and methyl, ethyl, or trifluoromethyl is more preferable.

$X^2$ has the same definition as that for $X^1$ in Formula (I-a) and the preferable range is the same as that of $X^1$.

The symbol "*" represents a connection site.

In a case where the polyimide resin used in the present invention includes a repeating unit represented by Formula (III), from a viewpoint of further improving gas permeability and separation selectivity, it is preferable that the number of moles of the repeating unit represented by Formula (I) in the polyimide resin is greater than the number of moles of the repeating unit represented by Formula (III).

The polyimide resin used in the present invention may include a repeating unit represented by the following Formula (V) in addition to the repeating unit represented by Formula (I) or the repeating unit represented by Formula (I) and the repeating unit represented by Formula (III).

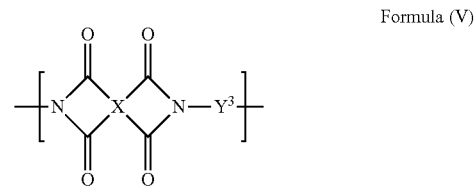

Formula (V)

In Formula (V), X has the same definition as that for X in Formula (I). $Y^3$ represents a group having a structure represented by the following Formula (VI).

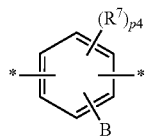

Formula (VI)

In Formula (VI), $R^7$ represents a substituent group. Examples of the substituent group include a group shown as examples of the group Z of substituent groups described below. Among these, $R^7$ preferably represents an alkyl group (the number of carbon atoms of the alkyl group is preferably in a range of 1 to 20, more preferably in a range of 1 to 10, and still more preferably in a range of 1 to 5, the alkyl group may include a heteroatom (preferably an oxygen atom or a sulfur atom) in a chain thereof, and preferred examples thereof include a methyl group, an ethyl group, a n-propyl group, an iso-propyl group, a tert-butyl group, and a trifluoromethyl group), a halogen atom (examples thereof include a fluorine atom, a chlorine atom, a bromine atom, and an iodine atom, and a fluorine atom is more preferable), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), or an alkoxycarbonyl group (the number of carbon atoms of the alkoxycarbonyl group is preferably in a range of 2 to 30 carbon atoms, more preferably in a range of 2 to 20 carbon atoms, and particularly preferably in a range of 2 to 12 carbon atoms, and examples thereof include methoxycarbonyl and ethoxycarbonyl) and more preferably represents an alkyl group or a halogen atom.

p4 showing the number of $R^7$'s represents an integer of 0 to 3, and p4 represents preferably 0 t o2, more preferably 0 or 1, and still more preferably 0.

B has the same definition as that for A and represents a dissociable group.

The symbol "*" represents a connection site. It is preferable that two connection sites are both present at the ortho- or meta-position.

Examples of the group Z of substituent groups include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, p-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), a carbamoyl group (the number of carbon atoms of the carbamoyl group is preferably in a range of 1 to 30, more preferably in a range of 1 to 20, and particularly preferably in a range of 1 to 12, and examples thereof include carbamoyl, methylcarbamoyl, diethylcarbamoyl, and phenylcarbamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), an amide phosphate group (the number of carbon atoms of the amide phosphate group is preferably in a range of 1 to 30, more preferably in a range of 1 to 20, and particularly preferably in a range of 1 to 12, and examples thereof include diethyl phosphoric acid amide and phenyl phosphoric acid amide), a hydroxy group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazine group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituent groups may be substituted with any one or more substituent groups selected from the group Z of substituent groups.

Further, in the present invention, when a plurality of substituent groups are present at one structural site, these substituent groups may be linked to each other and form a ring or may be condensed with some or entirety of the structural site and form an aromatic ring or an unsaturated hetero ring.

When a compound or a substituent group includes an alkyl group or an alkenyl group, these may be linear or branched and may be substituted or non-substituted. In addition, when a compound or a substituent group includes an aryl group or a heterocyclic group, these may be a single ring and may be substituted or non-substituted.

In the present specification, when a group is described as only a substituent group, the group Z of substituent groups can be used as reference unless otherwise specified. Further, when the names of the respective groups are described (for example, a group is described as an "alkyl group"), the preferable range and the specific examples of the corresponding group in the group Z of substituent groups are applied.

In the polyimide resin used in the present invention, the ratio of the repeating unit represented by Formula (I) or the repeating unit represented by Formula (III) or (V) to be incorporated as needed is not particularly limited and appropriately adjusted in consideration of gas permeability and gas separation selectivity according to the purpose of gas separation (recovery rate, purity, or the like).

In the polyimide resin used in the present invention, the amount of the repeating unit represented by Formula (I) is preferably 35% by mole or greater, more preferably 38% by mole or greater, and still more preferably 40% by mole or greater with respect to the total amount (100% by mole) of the repeating units represented by Formulae (I), (III), and (V). Further, the amount thereof may be 50% by mole or greater, 60% by mole or greater, or 100% by mole.

Moreover, in the polyimide resin used in the present invention, the amount of the repeating unit represented by Formula (III) is preferably in a range of 0% by mole to 65% by mole, more preferably in a range of 5% by mole to 50% by mole, and still more preferably in a range of 10% by mole to 45% by mole with respect to the total amount (100% by mole) of the repeating units represented by Formulae (I), (III), and (V).

In addition, it is preferable that the polyimide resin used in the present invention is configured of the repeating unit represented by formula (I), configured of the repeating units represented by Formulae (I) and (III), configured of the repeating units represented by Formulae (I) and (V), or configured of the repeating units represented by Formulae (I), (III), and (V). From the viewpoint of improving gas permeability, gas separation selectivity, resistance to impurities such as BTX, and mechanical strength, it is more preferable that the polyimide resin of the present invention is configured of the repeating units represented by Formulae (I), (III), and (V).

The weight average molecular weight of the polyimide resin used in the present invention is preferably in a range of 10000 to 1000000, more preferably in a range of 15000 to 500000, and still more preferably in a range of 20000 to 200000.

The molecular weight and the dispersity in the present specification are set to values measured using a gel permeation chromatography (GPC) method unless otherwise specified and the molecular weight is set to a weight average molecular weight in terms of polystyrene. A gel including an aromatic compound as a repeating unit is preferable as a gel filled into a column used for the GPC method and a gel formed of a styrene-divinylbenzene copolymer is exemplified. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 mL/min to 2 mL/min and most preferable that the measurement is performed at a flow rate thereof of 0.5 mL/min to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

(Synthesis of Polyimide Resin)

The polyimide resin which can be used in the present invention can be synthesized by performing condensation and polymerization of a specific bifunctional acid anhydride (tetracarboxylic dianhydride) and a specific diamine. As the method, a technique described in a general book (for example, "*The Latest Polyimide~Fundamentals and Applications~*" edited by Toshio Imai and Rikio Yokota, NTS Inc., Aug. 25, 2010, p. 3 to 49) can be appropriately selected.

In the synthesis of the polyimide resin which can be used in the present invention, at least one tetracarboxylic dianhydride which is a raw material is represented by the following Formula (VII). It is preferable that all tetracarboxylic dianhydrides are represented by the following Formula (VII).

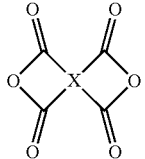

Formula (VII)

In Formula (VII), X has the same definition as that for X in Formula (I).

Specific examples of the tetracarboxylic dianhydride which can be used in the present invention are as follows.

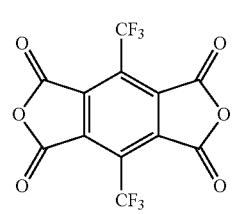

Anhydride-1

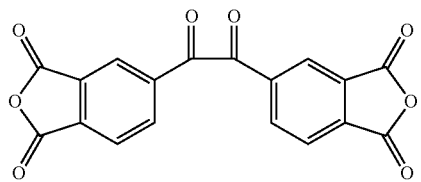

Anhydride-2

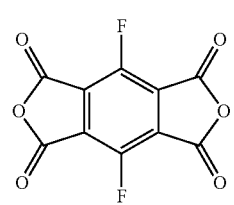

Anhydride-3

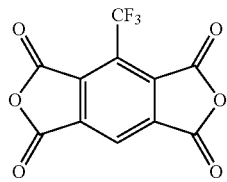

Anhydride-4

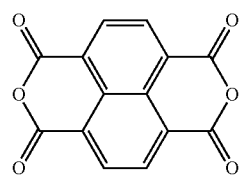

Anhydride-5

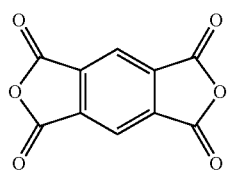

Anhydride-6

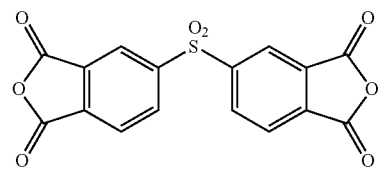

Anhydride-7

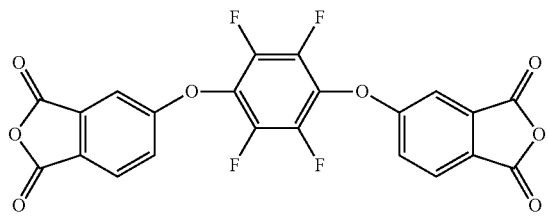

Anhydride-8

-continued
Anhydride-9
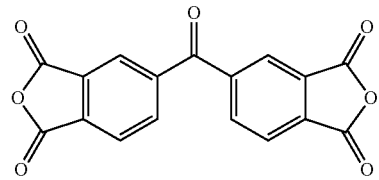
Anhydride-10
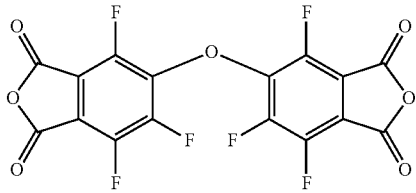
Anhydride-11
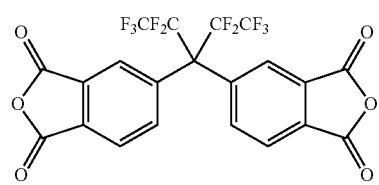
Anhydride-12
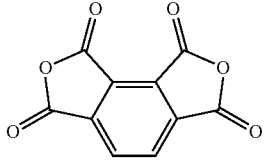
Anhydride-13
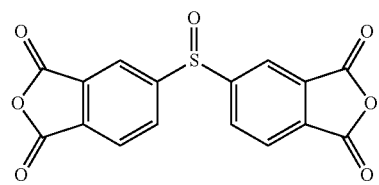
Anhydride-14
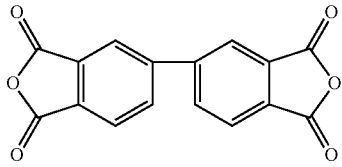
Anhydride-15
Anhydride-16
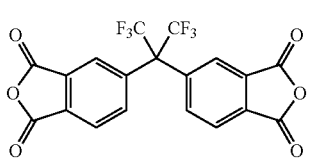
Anhydride-17
Anhydride-18
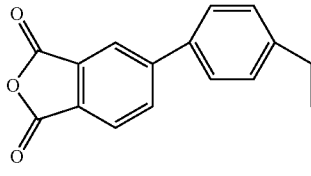
Anhydride-19
Anhydride-20
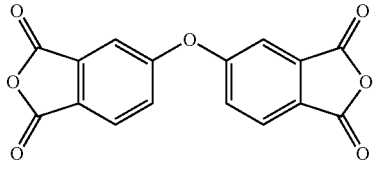
Anhydride-21
Anhydride-22
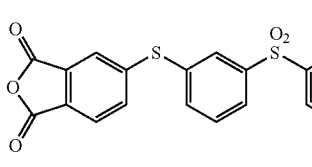
Anhydride-23
Anhydride-24
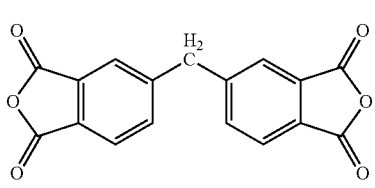

-continued
Anhydride-25
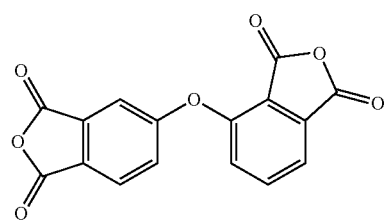
Anhydride-26
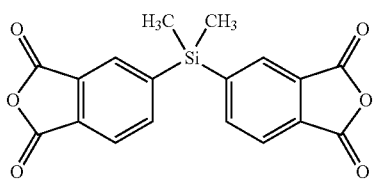
Anhydride-27
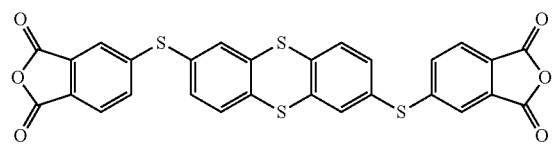
Anhydride-28
Anhydride-29
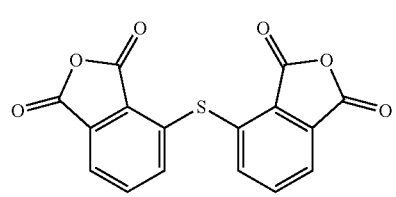
Anhydride-30
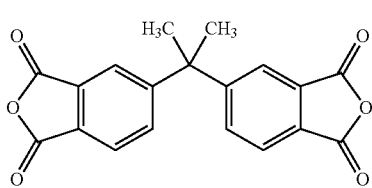
Anhydride-31
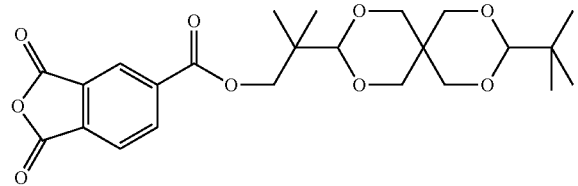
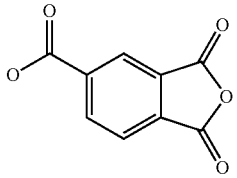
Anhydride-32
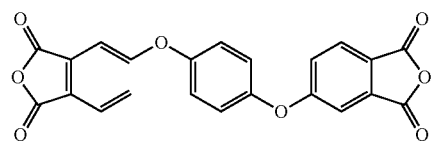
Anhydride-33
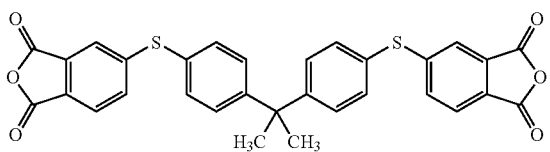
Anhydride-34
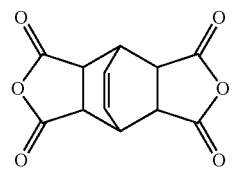
Anhydride-35
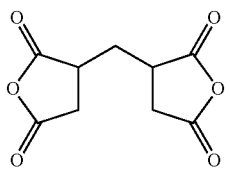
Anhydride-36
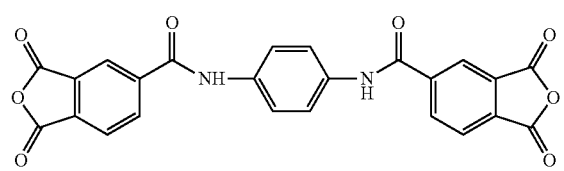
Anhydride-37
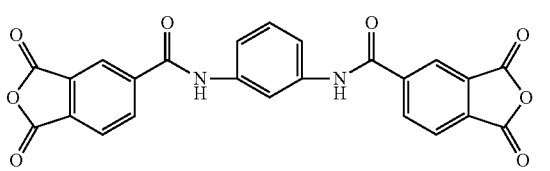
Anhydride-38
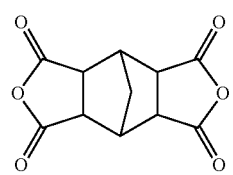
Anhydride-39
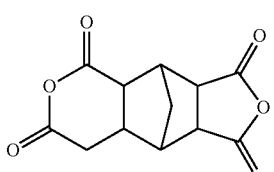

Anhydride-40

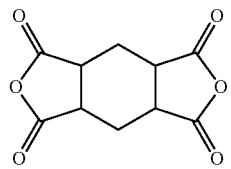

In the synthesis of the polyimide resin which can be used in the present invention, at least one diamine compound which is a raw material is represented by the following Formula (VIII-a) or (VIII-b).

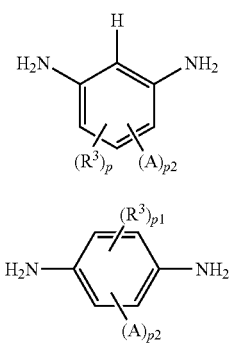

Formula (VIII-a)

Formula (VIII-b)

In Formula (VIII-a), $R^3$, p, A, and p2 respectively have the same definitions as those for $R^3$, p, A, and p2 in Formula (II-a). In Formula (VIII-b), $R^3$, p1, A, and p2 respectively have the same definitions as those for $R^3$, p1, A, and p2 in Formula (II-b).

Specific examples of the diamine represented by Formula (VIII-a) or (VIII-b) are as follows. In the example shown below, the symbol "*" represents a connection site.

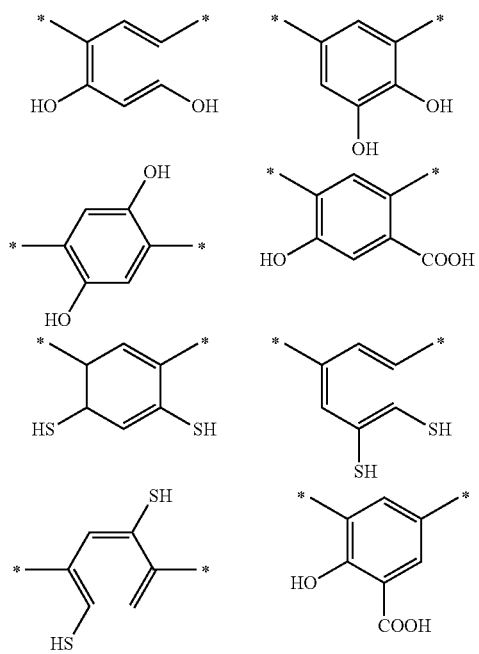

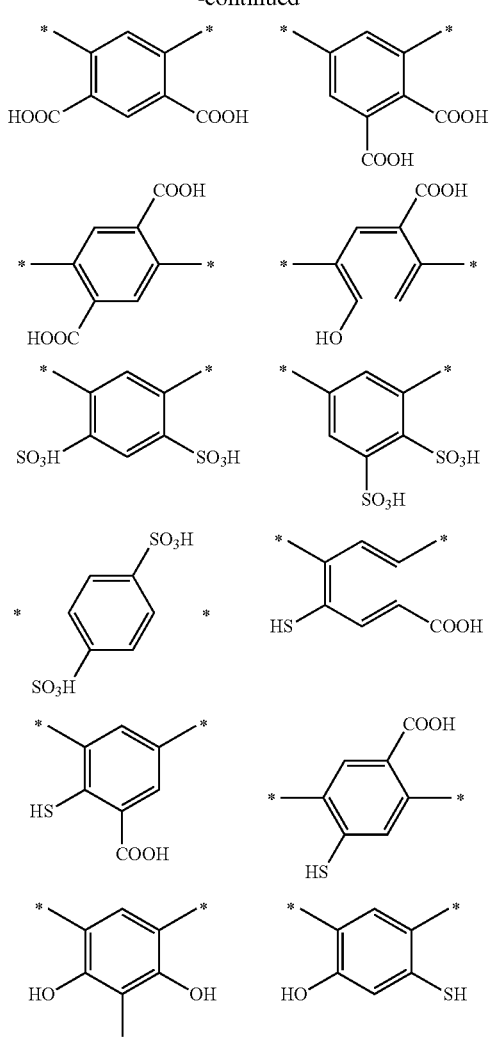

Further, in the synthesis of the polyimide resin which can be used in the present invention, a diamine represented by the following Formula (IX-a) or (IX-b) may be used as a diamine compound which is a raw material, in addition to the diamine represented by Formula (VIII-a) or (VIII-b).

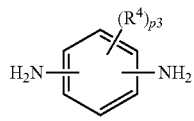

Formula (IX-a)

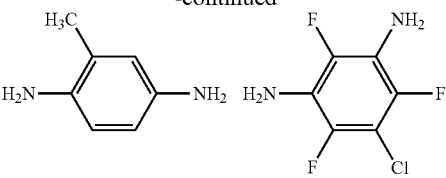
-continued
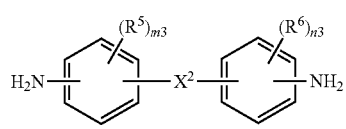
Formula (IX-b)
In Formula (IX-a), $R^4$ and p3 respectively have the same definitions as those for $R^4$ and p3 in Formula (IV-a).
In Formula (IX-b), $R^5$, $R^6$, $X^2$, m3, and n3 respectively have the same definitions as those for $R^5$, $R^6$, $X^2$, and n3 in Formula (IV-b).
As the diamine represented by Formula (IX-a) or (IX-b), any of the following examples can be used.
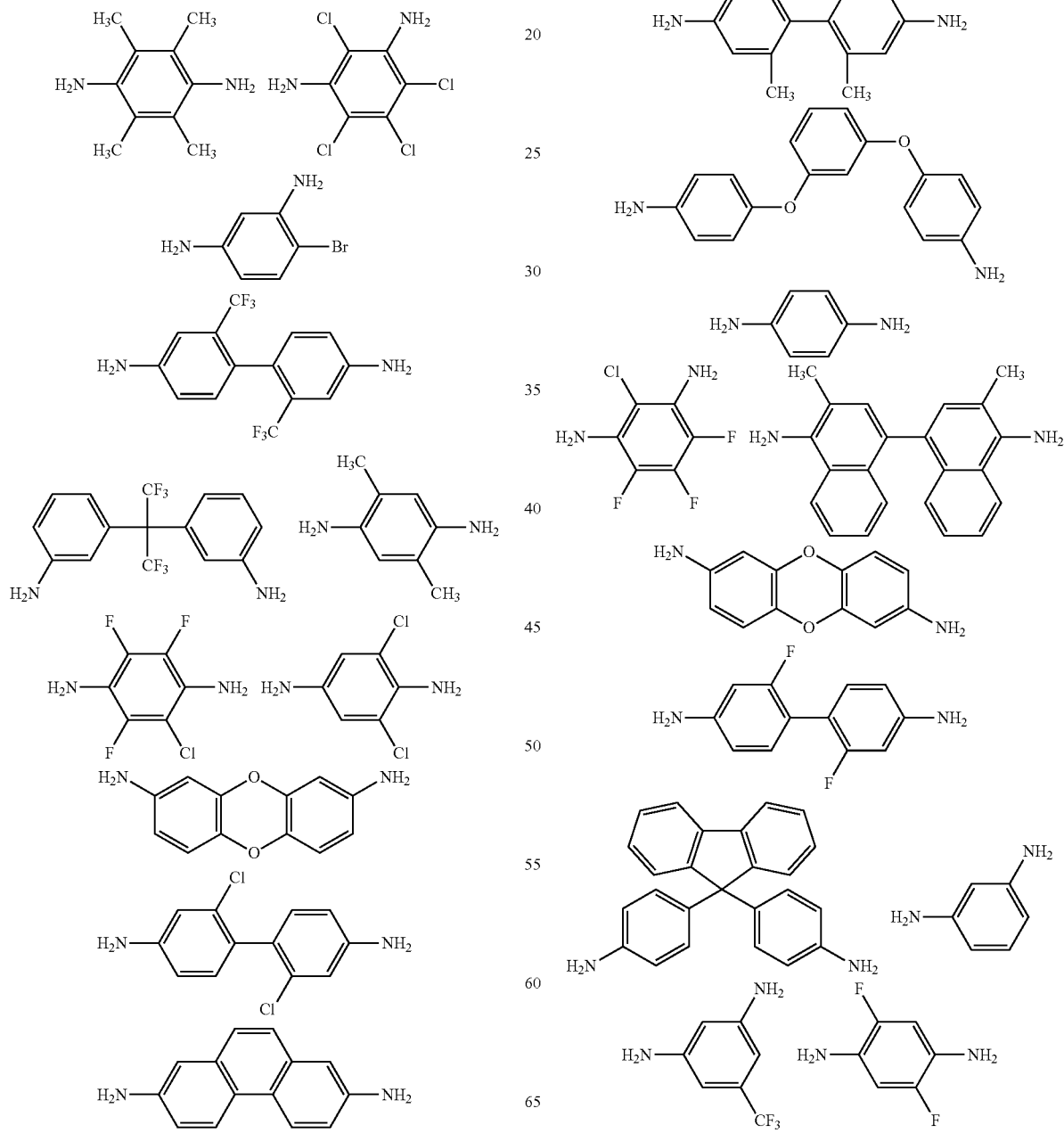

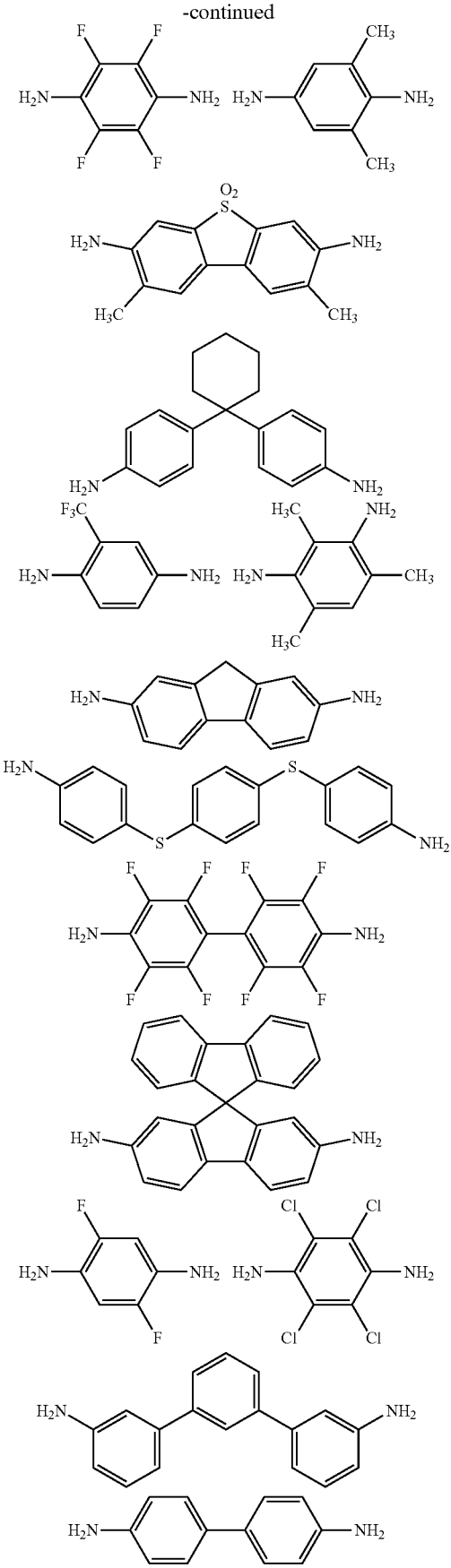
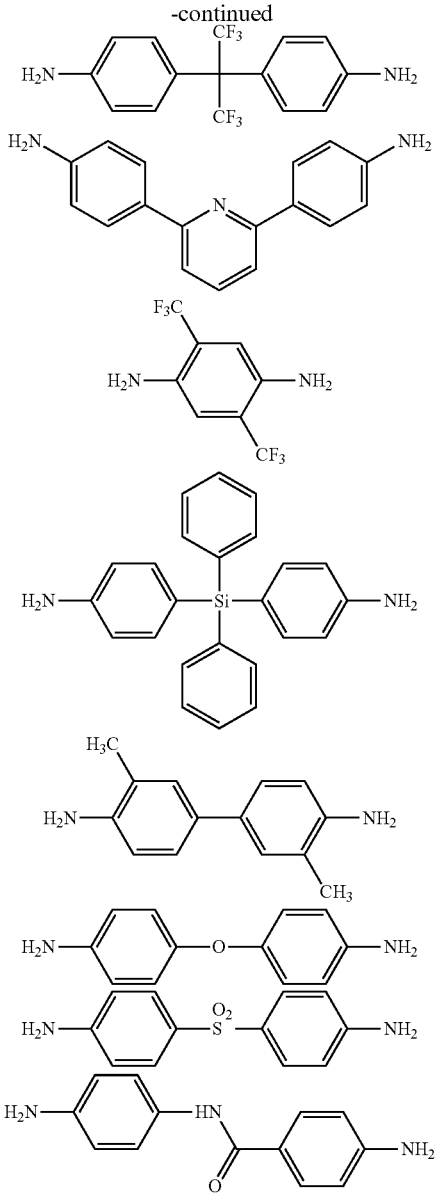

Further, in the synthesis of the polyimide resin which can be used in the present invention, a diamine represented by the following Formula (X) may be used as a diamine compound which is a raw material, in addition to the diamine represented by Formula (VIII-a) or (VIII-b) or the diamine represented by Formula (VIII-a) or (VIII-b) or the diamine represented by Formula (IX-a) or (IX-b).

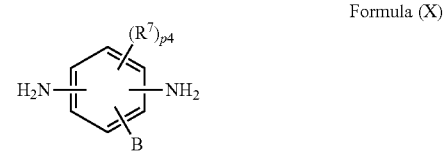

Formula (X)

In Formula (X), $R^7$, p4, and B respectively have the same definitions as those for $R^7$, p4, and B in Formula (VI).

As the diamine represented by Formula (X), any of the following examples can be used.

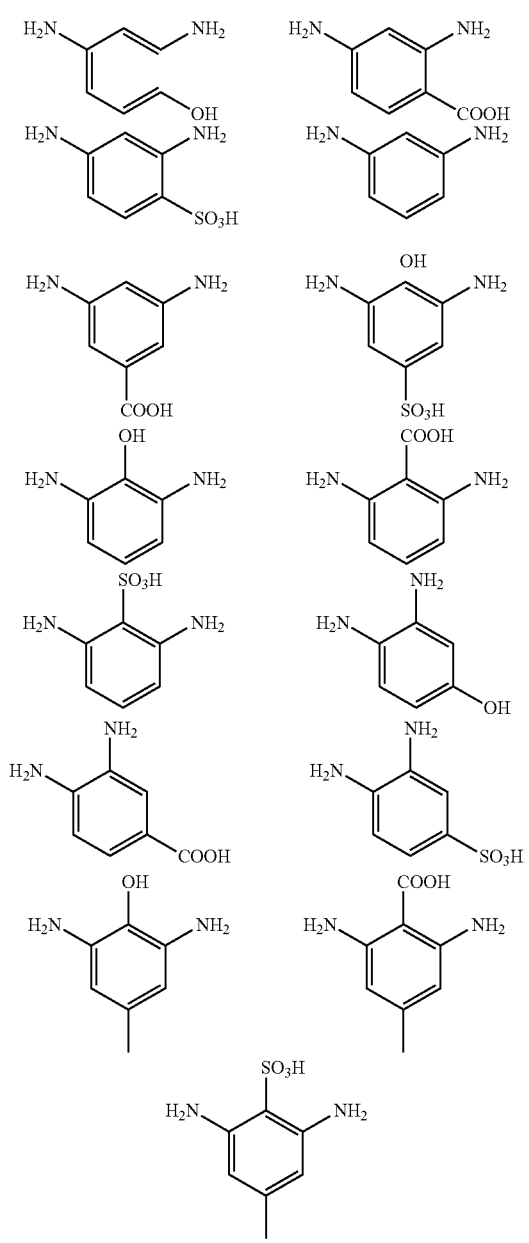

The above-described tetracarboxylic dianhydride and diamine may be used as an oligomer or a prepolymer in advance. The polyimide resin used in the present invention may be any one of a block copolymer, a random copolymer, and a graft copolymer.

The polyimide resin used in the present invention can be obtained by mixing the above-described respective raw materials in a solvent and performing condensation and polymerization using a normal method.

The solvent is not particularly limited. Examples thereof include an ester-based organic solvent such as methyl acetate, ethyl acetate, or butyl acetate; aliphatic ketone such as acetone, methyl ethyl ketone, methyl isobutyl ketone, diacetone alcohol, cyclopentanone, or cyclohexanone; an ether-based organic solvent such as ethylene glycol dimethyl ether, dibutyl butyl ether, tetrahydrofuran, methyl cyclopentyl ether, or dioxane; an amide-based organic solvent such as N-methylpyrrolidone, 2-pyrrolidone, dimethylformamide, dimethylimidazolidinone, or dimethylacetamide; and a sulfur-containing organic solvent such as dimethyl sulfoxide or sulfolane. These organic solvents can be suitably selected within the range in which a tetracarboxylic dianhydride and a diamine compound which are reaction substrates, polyamic acid which is a reaction intermediate, and a polyimide resin which is a final product can be dissolved. Among these, an ester-based organic solvent (preferably butyl acetate), aliphatic ketone (preferably methyl ethyl ketone, methyl isobutyl ketone, diacetone alcohol, cyclopentanone, or cyclohexanone), an ether-based organic solvent (diethylene glycol monomethyl ether or methyl cyclopentyl ether), an amide-based organic solvent, or a sulfur-containing organic solvent (dimethyl sulfoxide or sulfolane) is preferable. In addition, these can be used alone or in combination of two or more kinds thereof.

A temperature which can be normally employed for the synthesis of the polyimide resin can be employed without being particularly limited to the polymerization reaction temperature. Specifically, the temperature is preferably in a range of −40° C. to 60° C. and more preferably in a range of −30° C. to 50° C.

The polyimide resin can be obtained by imidizing the polyamic acid, which is generated by the above-described polymerization reaction, through a dehydration ring-closure reaction in a molecule. As a method of the dehydration ring-closure reaction, a method described in a general book (for example, "*The Latest Polyimide~Fundamentals and Applications~*" edited by Toshio Imai and Rikio Yokota, NTS Inc., Aug. 25, 2010, p. 3 to 49) can be used as reference. A thermal imidization method of performing heating in a temperature range 120° C. to 200° C. and removing water generated as a by-product to the outside the system for a reaction or a so-called chemical imidization method in which a dehydrating condensation agent such as an acetic anhydride, dicyclohexylcarbodiimide, or triphenyl phosphite is used in the coexistence of a basic catalyst such as pyridine, trimethylamine, or DBU is preferably used.

In the present invention, the total concentration of the tetracarboxylic dianhydride and the diamine compound in the polymerization reaction solution of the polyimide resin is not particularly limited. The total concentration thereof is preferably in a range of 5% by mass to 70% by mass, more preferably in a range of 5% by mass to 50% by mass, and still more preferably in a range of 5% by mass to 30% by mass.

[Composite Gas Separation Membrane]

In the composite gas separation membrane of the present invention, a gas separation layer containing a specific polyimide resin is formed on the upper side of a support layer having gas permeability. It is preferable that the composite membrane is formed by coating (the term "coating" in the present specification includes a form made by a coating material being adhered to a surface through immersion) at least the surface of a porous support with a coating solution (dope) that forms the above-described gas separation layer.

Figure 2:
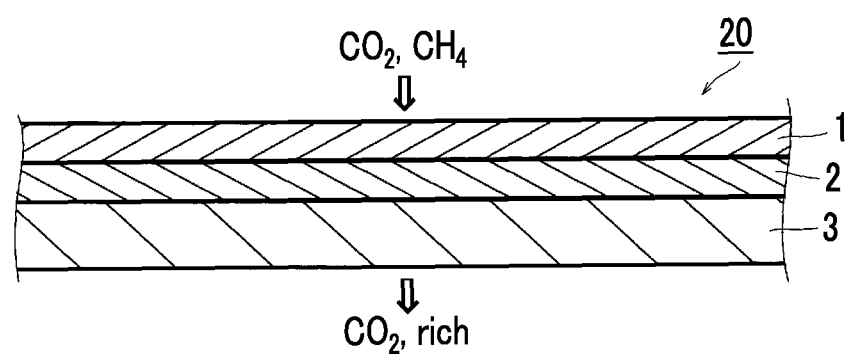
FIG. 2 is a sectional view schematically illustrating another embodiment of a composite gas separation membrane of the present invention.

FIG. 1 is a longitudinal sectional view schematically illustrating a composite gas separation membrane 10 which is a preferred embodiment of the present invention. The reference numeral 1 indicates a gas separation layer and the reference numeral 2 is a support layer formed of a porous layer. FIG. 2 is a sectional view schematically illustrating a composite gas separation membrane 20 which is another preferred embodiment of the present invention. In the embodiment, a non-woven fabric layer 3 is added as the support layer in addition to the gas separation layer 1 and the porous layer 2.

The expression "the upper side of the support layer" in the present specification means that another layer may be interposed between the support layer and the gas separation layer. In regard to the expressions related to up and down, the direction in which gas to be separated is supplied to is set as "up" and the direction in which the separated gas is discharged is set as "down" unless otherwise specified.

The composite gas separation membrane of the present invention may be obtained by forming and arranging a gas separation layer on the surface or inner surface of the porous support (support layer) and a composite membrane can be conveniently obtained by forming a gas separation layer at least on the surface thereof. When the gas separation layer is formed at least on the surface of the porous support, a composite membrane with an advantage of having high separation selectivity, high gas permeability, and mechanical strength at the same time can be obtained. It is preferable that the separation layer is as thin as possible from a viewpoint that high gas permeability is provided while mechanical strength and separation selectivity are maintained.

In the composite gas separation membrane of the present invention, the thickness of the gas separation layer is not particularly limited. The thickness thereof is preferably in a range of 0.01 μm to 5.0 μm and more preferably in a range of 0.05 μm to 2.0 μm.

The material of the porous support (porous layer) which is preferably applied to the support layer is not particularly limited and may be an organic or inorganic material as long as the material satisfies the purpose of providing mechanical strength and high gas permeability. A porous membrane of an organic polymer is preferable. The thickness thereof is preferably in a range of 1 μm to 3000 μm, more preferably in a range of 5 μm to 500 μm, and still more preferably in a range of 5 μm to 150 μm. In regard to the pore structure of the porous membrane, the average pore diameter is normally 10 μm or less, preferably 0.5 μm or less, and more preferably 0.2 μm or less. The porosity is preferably in a range of 20% to 90% and more preferably in a range of 30% to 80%. Further, the cut-off molecular weight of the porous layer is preferably 100000 or less. Moreover, the gas permeability is preferably $3 \times 10^{-5}$ $cm^3$ (STP)/$cm^2 \cdot cm \cdot sec \cdot cmHg$ (30 GPU) or greater in terms of the permeation rate of carbon dioxide at 40° C. and 40 atm. Examples of the material of the porous membrane include optional polymers, for example, a polyolefin resin such as polyethylene or polypropylene; a fluorine-containing resin such as polytetrafluoroethylene, polyvinyl fluoride, or polyvinylidene fluoride; and various resins such as polystyrene, cellulose acetate, polyurethane, polyacrylonitrile, polyphenylene oxide, polysulfone, polyether sulfone, polyimide, and polyaramid. As the shape of the porous membrane, any of a flat shape, a spiral shape, a tabular shape, and a hallow fiber shape can be employed.

In the composite gas separation membrane of the present invention, it is preferable that a support used to provide mechanical strength is formed in the lower portion of the support layer that forms the gas separation layer. Examples of such a support include woven fabric, non-woven fabric, and a net. In terms of film forming properties and the cost, non-woven fabric is preferably used. As the non-woven fabric, fibers formed of polyester, polypropylene, polyacrylonitrile, polyethylene, and polyamide may be used alone or in combination of plural kinds thereof. The non-woven fabric can be produced by papermaking main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

(Method of Producing Composite Gas Separation Membrane)

As the method of producing the composite membrane of the present invention, a production method that forms a gas separation layer by coating a support with a coating solution containing the polyimide resin is preferable. The content of the polyimide resin in the coating solution is not particularly limited. The content thereof is preferably in a range of 0.1% by mass to 30% by mass and more preferably in a range of 0.5% by mass to 10% by mass. When the content of the polyimide resin is extremely low, defects are highly likely to be generated on the surface layer that contributes to separation due to the polyimide resin easily infiltrating into the lower layer when a film is formed on the porous support. Meanwhile, when the content of the polyimide resin is extremely high, a pore is filled with the polyimide resin at a high concentration when a film is formed on the porous support and thus transparency may be degraded. The composite gas separation membrane of the present invention can be appropriately produced by adjusting the molecular weight, the structure, and the composition of a polymer of the separation layer.

—Organic Solvent—

The organic solvent serving as a medium of the coating solution is not particularly limited. Examples thereof include a hydrocarbon-based organic solvent such as n-hexane or n-heptane; an ester-based organic solvent such as methyl acetate, ethyl acetate, or butyl acetate; lower alcohol such as methanol, ethanol, n-propanol, isopropanol, n-butanol, isobutanol, or tert-butanol; aliphatic ketone such as acetone, methyl ethyl ketone, methyl isobutyl ketone, diacetone alcohol, cyclopentanone, or cyclohexanone; an ether-based organic solvent such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl butyl ether, tetrahydrofuran, methyl cyclopentyl ether, or dioxane; N-methylpyrrolidone; 2-pyrrolidone; dimethylformamide; dimethylimidazolidinone; dimethyl sulfoxide; and dimethylacetamide. These organic solvents can be suitably selected within the range not adversely affecting the support through erosion or the like. An ester-based organic solvent (preferably butyl acetate), an alcohol-based organic solvent (preferably methanol, ethanol, isopropanol, or isobutanol), aliphatic ketone (preferably methyl ethyl ketone, methyl isobutyl ketone, diacetone alcohol, cyclopentanone, or cyclohexanone), or an ether-based organic solvent (ethylene glycol, diethylene glycol monomethyl ether, or methyl cyclopentyl ether) is preferable. An aliphatic ketone-based organic solvent, an alcohol-based organic solvent, or an ether-based organic solvent is more preferable. In addition, these solvents can be used alone or in combination of two or more kinds thereof.

(Another Layer between Support Layer and Gas Separation Layer)

Another layer may be provided between the support layer and the gas separation layer in the composite gas separation membrane of the present invention. A siloxane compound layer is exemplified as a preferred example of another layer. When the siloxane compound layer is provided, it is possible to smooth unevenness of the outermost surface of the support and thus the separation layer is easily thinned. As the siloxane compound forming the siloxane compound layer, a compound whose main chain is formed of polysiloxane or a compound having a siloxane structure and a non-siloxane structure in the main chain is exemplified.

—Siloxane Compound whose Main Chain is Formed of Polysiloxane—

As the siloxane compound which is used in the siloxane compound layer and whose main chain is formed of polysiloxane, one or more kinds of polyorganosiloxanes represented by the following Formula (1) or (2) are exemplified. In addition, these polyorganosiloxanes may form a cross-linking reaction material. As the crosslinking reaction material, a compound represented by the following Formula (1), which is cross-linked by a polysiloxane compound having groups reacting with a reactive group X of the following Formula (1) for connection in both terminals thereof, is exemplified.

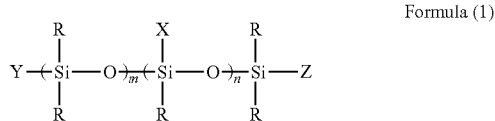

Formula (1)

In Formula (1), it is preferable that R represents a non-reactive alkyl group (the number of carbon atoms of the alkyl group is preferably in a range of 1 to 18 and more preferably in a range of 1 to 12) or a non-reactive aryl group (the number of carbon atoms of the aryl group is preferably in a range of 6 to 15 and more preferably in a range of 6 to 12, and phenyl is still more preferable).

It is preferable that X represents a reactive group and is selected from a hydrogen atom, a halogen atom, a vinyl group, a hydroxyl group, and a substituted alkyl group (the number of carbon atoms of the alkyl group is in a range of 1 to 18 and more preferably in a range of 1 to 12).

Y and Z are respectively the same as R and X described above.

The viscosity of the siloxane compound used in the present invention is not particularly limited. The viscosity at 25° C. is preferably in a range of 10 mPa·s to 100000 mPa·s and more preferably in a range of 20 mPa·s to 50000 mPa·s.

m represents an integer of 1 or greater and is preferably in a range of 1 to 100000.

n represents an integer of 0 or greater and is preferably in a range of 1 to 100000.

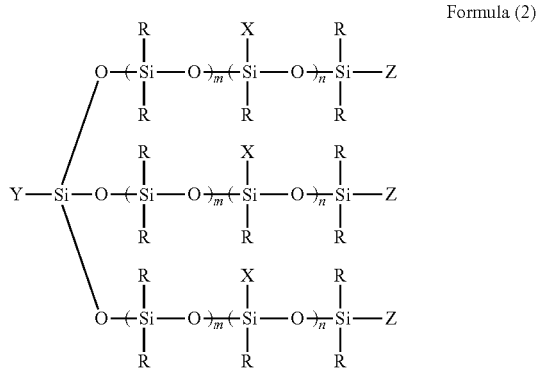

Formula (2)

In Formula (2), X, Y, Z, R, m, and n respectively have the same definitions as those for X, Y, Z, R, m, and n of Formula (1).

In Formulae (1) and (2), in a case where the non-reactive group R is an alkyl group, examples of the alkyl group include methyl, ethyl, hexyl, octyl, decyl, and octadecyl. Further, in a case where the non-reactive group R is a fluoroalkyl group, examples of the fluoroalkyl group include —$CH_2CH_2CF_3$ and —$CH_2CH_2C_6F_{13}$.

In Formulae (1) and (2), in a case where the reactive group X is a substituted alkyl group, examples of the alkyl group include a hydroxyalkyl group having 1 to 18 carbon atoms, an aminoalkyl group having 1 to 18 carbon atoms, a carboxyalkyl group having 1 to 18 carbon atoms, a chloroalkyl group having 1 to 18 carbon atoms, a glycidoxyalkyl group having 1 to 18 carbon atoms, a glycidyl group, an epoxychclohexyl alkyl group having 7 to 16 carbon atoms, a (1-oxacyclobutane-3-yl)alkyl group having 4 to 18 carbon atoms, a metacryloxy alkyl group, and a mercaptoalkyl group.

The number of carbon atoms of the alkyl group constituting the hydroxyalkyl group is preferably an integer of 1 to 10 and examples thereof include —$CH_2CH_2CH_2OH$.

The number of carbon atoms of the alkyl group constituting the aminoalkyl group is preferably an integer of 1 to 10 and examples thereof include —$CH_2CH_2CH_2NH_2$.

The number of carbon atoms of the alkyl group constituting the carboxyalkyl group is preferably an integer of 1 to 10 and examples thereof include —$CH_2CH_2CH_2COOH$.

The number of carbon atoms of the alkyl group constituting the chloroalkyl group is preferably an integer of 1 to 10 and preferred examples thereof include —$CH_2Cl$.

The number of carbon atoms of the alkyl group constituting the glycidoxyalkyl group is preferably an integer of 1 to 10 and preferred examples thereof include 3-glycidyloxypropyl.

The number of carbon atoms of the epoxycyclohexylalkyl group having 7 to 16 carbon atoms preferably an integer of 8 to 12.

The number of carbon atoms of the (1-oxacyclobutane-3-yl)alkyl group having 4 to 18 carbon atoms is preferably an integer of 4 to 10.

The number of carbon atoms of the alkyl group constituting the methacryloxyalkyl group is preferably an integer of 1 to 10 and examples thereof include —$CH_2CH_2CH_2$—OOC—C($CH_3$)=$CH_2$.

The number of carbon atoms of the alkyl group constituting the mercaptoalkyl group is preferably an integer of 1 to 10 and examples thereof include —$CH_2CH_2CH_2SH$.

It is preferable that m and n represent an integer in which the molecular weight of the compound is in a range of 5000 to 1000000.

In Formulae (1) and (2), distribution of reactive group-containing siloxane units (in the formula, constituent units whose number is represented by n) and siloxane units (in the formula, constituent units whose number is represented by m) which does not include a reactive group is not particularly limited. That is, in Formulae (1) and (2), (Si(R)(R)—O) units and (Si(R)(X)—O) units may be distributed in a random manner.

—Compound having a Siloxane Structure and a Non-Siloxane Structure in Main Chain thereof—

Examples of a compound which can be used for a siloxane compound layer and has a siloxane structure and a non-siloxane structure in the main chain thereof include compounds represented by the following Formulae (3) to (7).

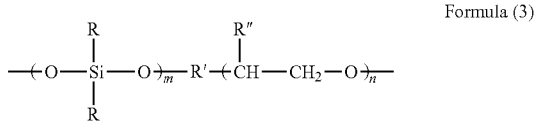

Formula (3)

In Formula (3), R, m, and n respectively have the same definitions as those for R, m, and n of Formula (1). R' represents —O— or —CH$_2$— and R" represents a hydrogen atom or methyl. It is preferable that both terminals of Formula (3) are bonded to an amino group, a hydroxyl group, a carboxy group, a trimethylsilyl group, an epoxy group, a vinyl group, a hydrogen atom, or a substituted alkyl group.

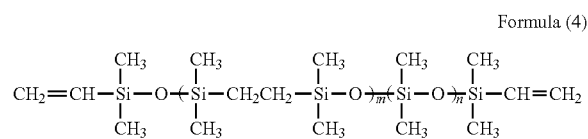

Formula (4)

In Formula (4), m and n respectively have the same definitions as those for m and n in Formula (1).

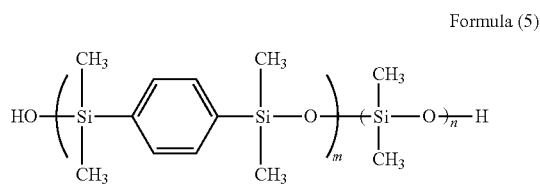

Formula (5)

In Formula (5), m and n respectively have the same definitions as those for m and n in Formula (1).

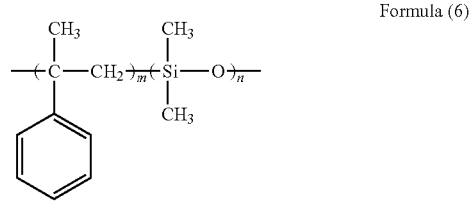

Formula (6)

In Formula (6), m and n respectively have the same definitions as those for m and n of Formula (1). It is preferable that both terminals of Formula (6) are bonded to an amino group, a hydroxyl group, a carboxy group, a trimethylsilyl group, an epoxy group, a vinyl group, a hydrogen atom, or a substituted alkyl group.

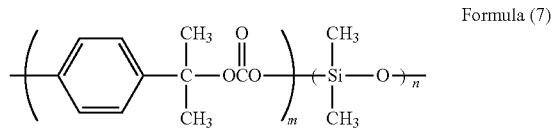

Formula (7)

In Formula (7), m and n respectively have the same definitions as those for m and n of Formula (1). It is preferable that both terminals of Formula (7) are bonded to an amino group, a hydroxyl group, a carboxy group, a trimethylsilyl group, an epoxy group, a vinyl group, a hydrogen atom, or a substituted alkyl group.

In Formulae (3) to (7), the siloxane structural units and the non-siloxane structural units may be distributed in a random manner.

The compound having a siloxane structure and a non-siloxane structure in the main chain thereof contains preferably 50% by mole or greater of the siloxane structural units and more preferably 70% by mole or greater of the siloxane structural units with respect to the total number of moles of the entirety of the repeating structural units.

The weight average molecular weight of the siloxane compound used for the siloxane compound layer is preferably in a range of 5000 to 1000000 from a viewpoint of thinning a membrane and durability. The method of measuring the weight average molecular weight is as described above.

Further, preferred examples of the siloxane compound constituting the siloxane compound layer include polydimethylsiloxane, polymethylphenylsiloxane, polydiphenylsiloxane, a polysulfone-polyhydroxystyrene-polydimethylsiloxane copolymer, a dimethylsiloxane-methylvinylsiloxane copolymer, a dimethylsiloxane-diphenylsiloxane-methylvinylsiloxane copolymer, a methyl-3,3,3-trifluoropropyl siloxane-methylvinyl siloxane copolymer, a dimethylsiloxane-methylphenylsiloxane-methylvinylsiloxane copolymer, a vinyl terminated diphenylsiloxane-dimethylsiloxane copolymer, vinyl terminated polydimethylsiloxane, H-terminated polydimethylsiloxane, and a dimethylsiolxane-methylhydrosiloxane copolymer. Further, one or more kinds selected from the above can be used. Moreover, these may be used to form a crosslinking reaction material.

In the composite membrane of the present invention, the thickness of the siloxane compound layer is preferably in a range of 0.01 μm to 5μ and more preferably in a range of 0.05 μm to 1 μm from a viewpoint of smoothness and gas permeability.

Moreover, the gas permeability of the siloxane compound layer at 40° C. and 40 atm is preferably 100 GPU or greater, more preferably 300 GPU or greater, and still more preferably 1000 GPU or greater in terms of the carbon dioxide permeation rate.

[Use and Characteristics of Composite Gas Separation Membrane]

The composite gas separation membrane of the present invention can be suitably used according to a gas separation recovery method and a gas separation purification method. For example, a gas separation membrane which is capable of selectively and efficiently separating specific gas from a gas mixture containing gas, for example, hydrocarbon such as hydrogen, helium, carbon monoxide, carbon dioxide, hydrogen sulfide, oxygen, nitrogen, ammonia, a sulfur oxide, a nitrogen oxide, methane, or ethane; unsaturated hydrocarbon such as propylene; or a perfluoro compound such as tetrafluoroethane can be obtained. Particularly, it is preferable that a gas separation membrane selectively separating carbon dioxide from a gas mixture containing carbon dioxide and hydrocarbon (for example, methane or ethane) is obtained.

In addition, in a case where gas subjected to a separation treatment is mixed gas of carbon dioxide and methane, the permeation rate of the carbon dioxide at 40° C. and 40 atm is preferably greater than 20 GPU, more preferably greater than 30 GPU, still more preferably greater than 50 GPU, even still more preferably greater than 60 GPU, and even still more preferably in a range of 60 GPU to 300 GPU. The ratio between permeation rates of carbon dioxide and methane ($R_{CO2}/R_{CH4}$) is preferably 15 or greater, more preferably 20 or greater, still more preferably 23 or greater, and particularly preferably in a range of 25 to 50. $R_{CO2}$ represents the permeation rate of carbon dioxide and $R_{CH4}$ represents the permeation rate of methane.

Further, 1 GPU is $1 \times 10^{-6}$ cm$^3$ (STP)/cm$^2$·cm·sec·cmHg (Other Components)

Since membrane physical properties are adjusted, various polymer compounds can be added to the composite gas separation membrane of the present invention. Examples of the polymer compound which can be used include an acrylic polymer, a polyurethane resin, a polyamide resin, a polyester resin, an epoxy resin, a phenol resin, a polycarbonate resin, a polyvinyl butyral resin, a polyvinyl formal resin, shellac, a vinyl resin, an acrylic resin, a rubber resin, waxes, and other natural resins. Further, these may be used in combination of two or more kinds thereof.

Moreover, a non-ionic surfactant, a cationic surfactant, or an organic fluoro compound can be added in order to adjust liquid properties.

Specific examples of the surfactant include anionic surfactants such as alkyl benzene sulfonate, alkyl naphthalene sulfonate, higher fatty acid salts, sulfonate of higher fatty ester, sulfuric ester salts of higher alcohol ether, sulfonate of higher alcohol ether, alkyl carboxylate of higher alkyl sulfonamide, and alkyl phosphate; non-ionic surfactants such as polyoxyethylene alkyl ether, polyoxyethylene alkyl phenyl ether, polyoxyethylene fatty acid ester, sorbitan fatty acid ester, an ethylene oxide adduct of acetylene glycol, an ethylene oxide adduct of glycerin, and polyoxyethylene sorbitan fatty acid ester; and amphoteric surfactants such as alkyl betaine and amide betaine; a silicon-based surfactant; and a fluorine-based surfactant, and the surfactant can be suitably selected from optional surfactants and derivatives thereof.

Specific examples of the polymer dispersant include polyvinyl pyrrolidone, polyvinyl alcohol, polyvinyl methyl ether, polyethylene oxide, polyethylene glycol, polypropylene glycol, and polyacrylamide. Among these, polyvinyl pyrrolidone is preferably used.

The conditions of forming the composite gas separation membrane of the present invention are not particularly limited. The temperature thereof is preferably in a range of −30° C. to 100° C., more preferably in a range of −10° C. to 80° C., and particularly preferably in a range of 5° C. to 50° C.

In the present invention, when a membrane is formed, gas such as air or oxygen may be allowed to coexist. It is desired that the membrane is formed under an inert gas atmosphere.

In the composite gas separation membrane of the present invention, the content of the polyimide resin in the gas separation layer is not particularly limited as long as target gas separation performance can be obtained. From a viewpoint of improving the gas separation performance, the content of the polyimide resin in the gas separation layer is preferably 20% by mass or greater, more preferably 40% by mass or greater, still more preferably 60% by mass or greater, and particularly preferably 70% by mass or greater. Further, the content of the polyimide resin in the gas separation layer may be 100% by mass. The content thereof is normally 99% by mass or less.

[Method of Separating Gas Mixture]

The gas separation method of the present invention is a method that includes a process of selectively transmitting carbon dioxide from mixed gas containing carbon dioxide and methane. The pressure at the time of gas separation is preferably in a range of 10 atm to 100 atm and more preferably in a range of 20 atm to 70 atm. Further, the gas separation temperature is preferably in a range of −30° C. to 90° C. and more preferably in a range of 15° C. to 70° C. In the mixed gas containing carbon dioxide and methane gas, the mixing ratio of carbon dioxide to methane gas is not particularly limited. The mixing ratio thereof (carbon dioxide:methane gas) is preferably in a range of 1:99 to 99:1 (volume ratio) and more preferably in a range of 5:95 to 95:5 (volume ratio).

[Gas Separation Module and Gas Separation Apparatus]

The composite gas separation membrane of the present invention is a composite membrane combining with a porous support and a gas separation module can be prepared using the composite gas separation membrane. Examples of the module include a spiral type module, a hollow fiber type module, a pleated module, a tabular module, and a plate & frame type module.

Moreover, when the composite gas separation membrane or the gas separation module of the present invention is used, it is possible to obtain a gas separation apparatus having means for performing separation and recovery of gas or performing separation and purification of gas. The composite gas separation membrane of the present invention may be applied to a gas separation and recovery apparatus which is used together with an absorption liquid described in JP2007-297605A according to a membrane/absorption hybrid method.

EXAMPLES

The present invention will be described in detail with reference to examples, but the present invention is not limited these examples.

Synthesis Example 1

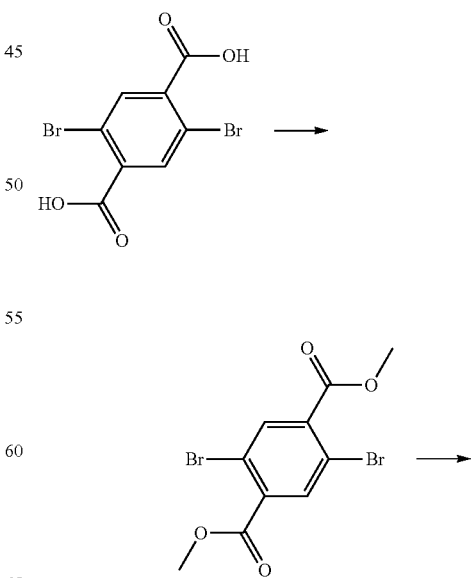

1

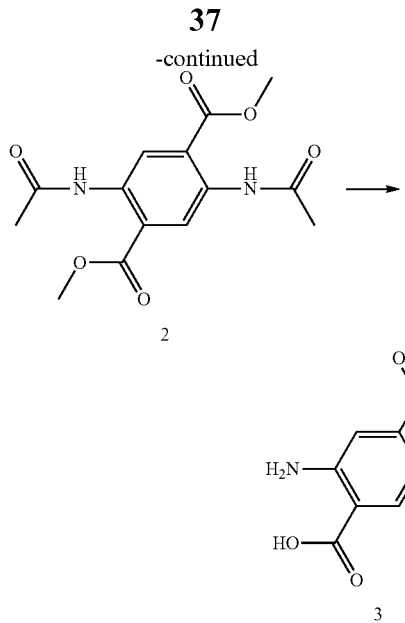

Synthesis of Compound 3:

25.00 g of 2,5-dibromo terephthalic acid, 15.13 g of sulfuric acid, and 250 mL of methanol were added to a 500 mL three-necked flask, the three-neck flask was heated, and then the mixture was refluxed for 3 hours. After the reflux was finished, water was added thereto, and precipitates were collected by filtration and washed with water. The obtained solid was dissolved in ethyl acetate at 50° C., washed with a saturated aqueous sodium bicarbonate solution, dried over magnesium sulfate, filtered, and concentrated. 500 mL and 100 mL of ethyl acetate were added to the concentrate and the mixture was precipitated and filtered, thereby obtaining 25.6 g (yield of 94%) of a compound 1.

11.34 g of the compound 1, 4.57 g of acetamide, 29.39 g of cesium carbonate, 0.56 g of Xantphos, 0.30 g of tris (dibenzylideneacetone)dipalladium(0), and 300 mL of 1,4-dioxane were added to a 1L three-necked flask and the mixture was stirred in a nitrogen stream at 100° C. for 8 hours. 500 mL of water was added to the reaction solution and the precipitates were filtered and washed with 500 mL of methanol, thereby obtaining 5.3 g of a compound 2 (yield of 53%).

5.3 g of the compound 2 and 25 mL of hydrochloric acid were added to a 200 mL three-necked flask and the mixture was refluxed for 6 hours and stirred. The reaction solution was filtered, 500 mL of water was added to the filtrate, and the precipitates were filtered, refluxed in 100 mL acetone for 1 hour, stirred, and filtered, thereby obtaining 1.5 g (yield of 29%) of a compound 3.

Synthesis Example 2

Synthesis of Polymer (P-101):

96.00 g of N-methylpyrrolidone, 5.33 g of 4,6-diamonoresorcinol dihydrochloride, and 1.85 g of lithium carbonate were added to a 300 mL three-necked flask and the mixture was stirred in a nitrogen stream at 40° C. for 30 minutes. The mixture was cooled at room temperature, 11.11 g of a 4,4'-(hexafluoroisopropylidene)diphthalic anhydride was added thereto, and then the mixture was stirred in a nitrogen stream for 30 minutes. 47.98 g of toluene was added thereto and the mixture was heated at 180° C., stirred for 6 hours, and azeotropically distilled. The mixture was cooled at room temperature, diluted with 125.00 g of acetone, added dropwise to 1800.00 g of methanol, and the obtained polymer was suctioned and filtered. The obtained polymer was washed with 200 g of methanol and air-dried at 70° C., thereby obtaining 13.15 g of a polymer (P-101) formed of the following structural unit (repeating unit). The symbol "*" in the following formula represents a connection site of $Y^1$.

P-101

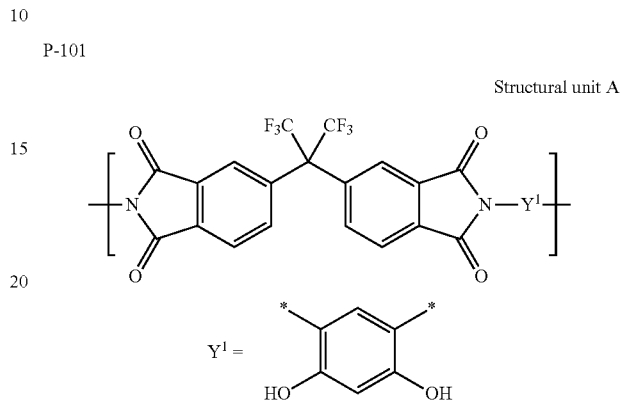

Weight Average Molecular Weight:

145000

Synthesis of Polymers (P102 to P108)

Respective polymers P102 to P108 formed of the following structural units (repeating units) were synthesized according to Synthesis Example 2. The symbol "*" in the following formulae represents a connection site of $Y^1$ to $Y^3$.

P-102

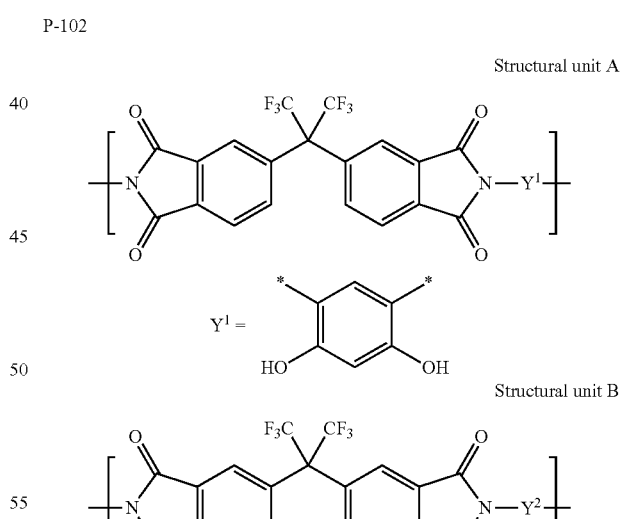

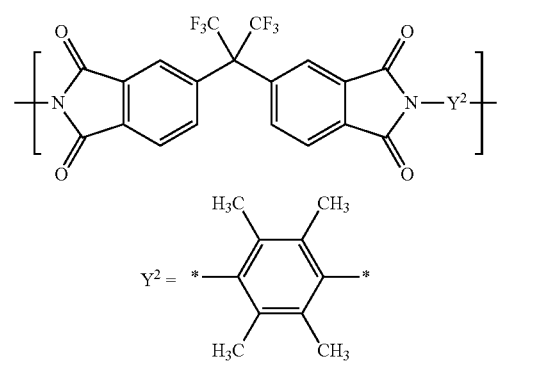

Structural Unit A:Structural Unit B=40:60 (Molar Ratio)
Weight Average Molecular Weight: 113000

P-103

Structural unit A

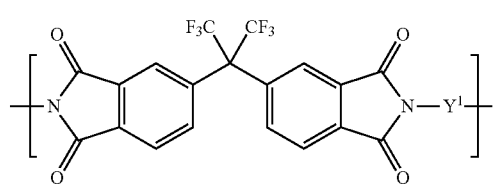

$Y^1 =$ 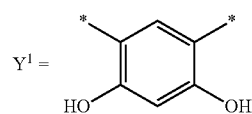

Structural unit B

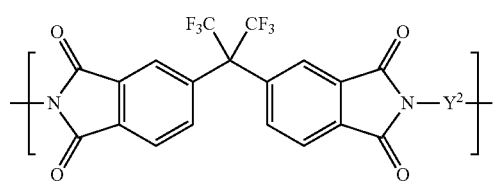

$Y^2 =$ 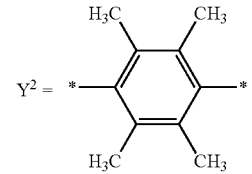

Structural Unit A:Structural Unit B=60:40 (Molar Ratio)
Weight Average Molecular Weight 121000

P-104

Structural unit C

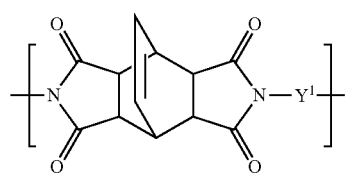

$Y^1 =$ 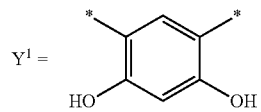

Structural unit D

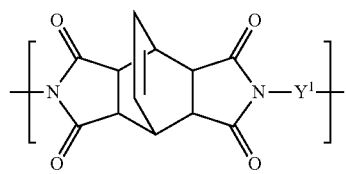

$Y^1 =$ 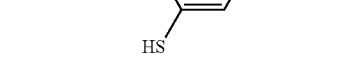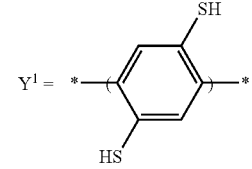

Structural unit E

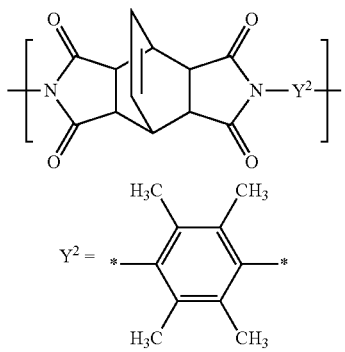

$Y^2 =$ *—⬡—*  (tetramethylphenylene)

Structural Unit C:Structural Unit D:Structural Unit E=40:40:20 (Molar Ratio)

Weight Average Molecular Weight: 135000

P-105

Structural unit F

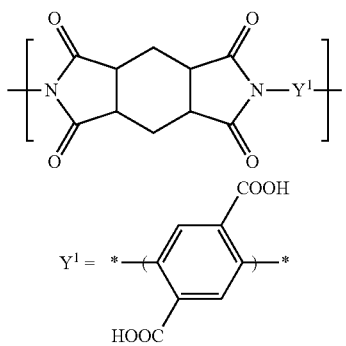

$Y^1 =$ 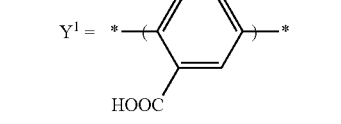

Structural unit G (structure with imide and tetramethylphenylene Y²)

$Y^2 =$ *—⬡—*

Structural Unit F:Structural Unit G=80:20 (Molar Ratio)
Weight Average Molecular Weight: 102000

P-106

Structural unit A

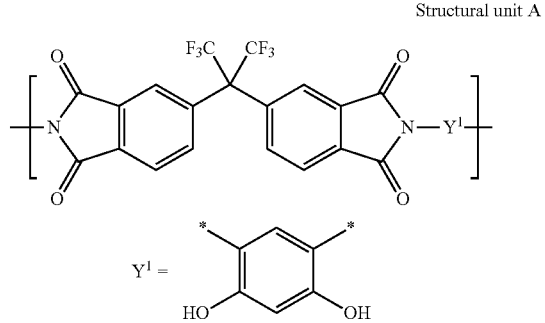

Structural unit H

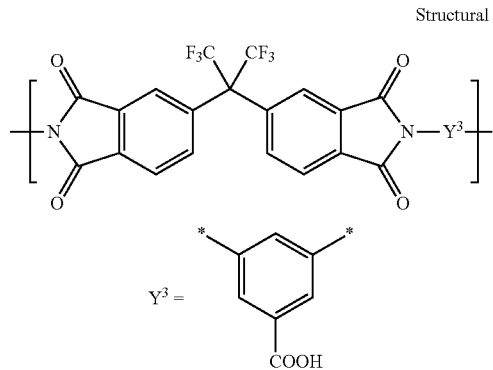

Structural Unit A:Structural Unit H=50:50 (Molar Ratio)
Weight Average Molecular Weight 114000

P-107

Structural unit I

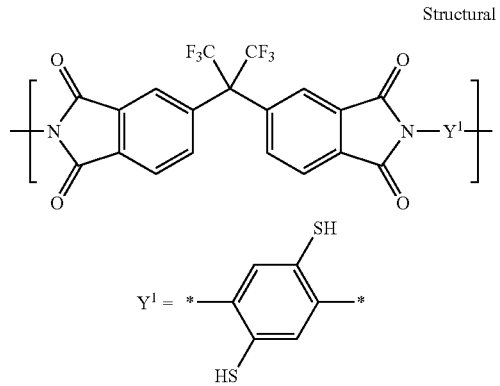

Structural unit B

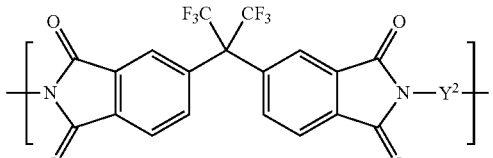

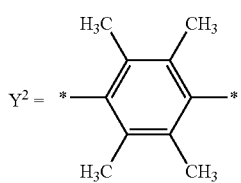

Structural unit J

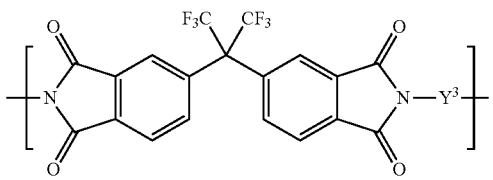

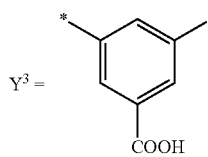

Structural Unit I:Structural Unit B:Structural Unit J=45:10:45 (Molar Ratio)
Weight Average Molecular Weight: 151000

P-108

Comparative polymer

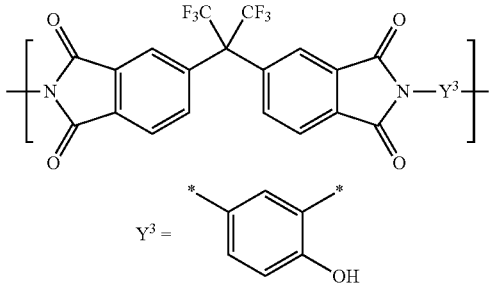

Weight Average Molecular Weight: 954000

Example 1

Preparation of Composite Membrane 1.4 g of the polymer (P-101) and 8.6 g of methyl ethyl ketone were mixed with each other in a 30 mL brown vial bottle and stirred for 30 minutes, 28 mg of 1-hydroxycyclohexyl phenyl ketone (manufactured by Sigma-Aldrich Japan K.K., product No: 40,561-2) added thereto, and then the mixture was stirred for 30 minutes. A polyacrylonitrile porous membrane (manufactured by GMT Inc.) was allowed to stand still on a clean glass plate having a dimension of 10 cm² and the polymer solution was cast on the surface of the porous support film using an applicator, thereby obtaining a composite membrane (membrane 101). The thickness of the polymer (P-101) was 1 μm or less and the thickness of the polyacrylonitrile porous film including non-woven fabric was approximately 180 μm.

In addition, the polyacrylonitrile porous membrane having a cut-off molecular weight of 100000 or less was used. Further, the permeation rate of the carbon dioxide at 40° C. and 40 atm was 25000 GPU.

Examples 2 to 6

Preparation of Composite Membrane

Composite membranes 2 to 6 were prepared by changing the polyimide resin in the above-described membrane 101, as listed in Table 2.

Comparative Example 1

Preparation of Asymmetric Membrane (Membrane c101)

An asymmetric membrane was prepared according to a method described in U.S. Pat. No. 5,928,410. The membrane thickness of the asymmetric membrane was approximately 130 μm and the thickness of the skin layer contributing to membrane separation was approximately 5 μm.

Comparative Example 2

Preparation of Single Membrane (Membrane c102)

A single membrane was prepared according to a method described in U.S. Pat. No. 5,591,250. The membrane thickness of the single membrane was approximately 50 μm.

Comparative Example 3

Preparation of Composite Membrane

A composite membrane of Comparative Example 3 was prepared by changing the polyimide resin in the above-described membrane 101, as listed in Table 2.

Test Example 1

Evaluation of Gas Permeability

In the obtained composite membranes, the volume ratio of carbon dioxide ($CO_2$) to methane ($CH_4$) was set to 1:1 using a SUS316 stainless steel cell (manufactured by DENISSEN Ltd.) having high pressure resistance with a mass flow controller, $CO_2$ and $CH_4$ were supplied from the gas separation layer side (skin layer side) formed of a polyimide resin by setting the total pressure on the gas supply side to 40 atm (partial pressure of $CO_2$ and $CH_4$: 20 atm) at a temperature of 40° C. and then each of the gas permeability was measured using TCD detection type gas chromatography. The gas permeabilities of membranes are compared to each other by calculating the gas permeation rate as gas permeability (permeance). The unit of the gas permeability (gas permeation rate) was shown by the unit of GPU [1 GPU=1×10$^{-6}$ cm$^3$ (STP)/cm$^2$·sec·cmHg]

Test Example 2

Toluene Exposure Test

A 100 mL beaker was allowed to stand still in a glass container capable of covering a toluene solvent with a stretched lid, composite gas separation membrane prepared in Examples and Comparative Examples were put into the beaker, and the container was covered with the lid made of glass to obtain a closed system. Thereafter, the closed system was stored under a temperature condition of 40° C. for 24 hours and gas separation performance was evaluated in the same manner as described above.

Test Example 3

Pressure Resistance Test

Asymmetric membranes, single membranes, and composite membranes obtained in Examples and Comparative Examples were cut out in a circular shape having a diameter of 47 mm, the cut membranes were interposed between cells, a pressure condition of 1 MPa was set in an autoclave, the membranes were taken out from the cells, and then the state of fractures and cracks was evaluated in four steps through visual observation.

A: Fractures and cracks were not seen at all.

B: Cracks were slightly detected.

C: Fractures and cracks were partially generated.

D: Most membranes were fractured.

The results of Test Examples described above are listed in the following Table 1.

TABLE 1

| | Form of membrane | Membrane No. | Polymer | $CO_2$ permeation rate (GPU) | $R_{CO2}/R_{CH4}$ (ratio between gas permeation rates) | | Pressure resistance test |
| --- | --- | --- | --- | --- | --- | --- | --- |
| | | | | | Untreated | After toluene exposure | |
| Example 1 | Composite membrane | 101 | P-101 | 55 | 28 | 22 | B |
| Example 2 | | 102 | P-102 | 64 | 30 | 26 | B |
| Example 3 | | 103 | P-103 | 70 | 32 | 29 | A |
| Example 4 | | 104 | P-104 | 75 | 38 | 37 | A |
| Example 5 | | 105 | P-105 | 84 | 43 | 39 | A |
| Example 6 | | 106 | P-106 | 80 | 45 | 42 | A |
| Example 7 | | 107 | P-107 | 91 | 47 | 46 | A |
| Comparative Example 1 | Asymmetric membrane | c101 | P-101 | 9.72 | 14 | 9 | D |
| Comparative Example 2 | Single membrane | c102 | P-101 | 0.51 | 15 | 8 | C |

TABLE 1-continued

| | Form of membrane | Membrane No. | Polymer | $CO_2$ permeation rate (GPU) | $R_{CO2}/R_{CH4}$ (ratio between gas permeation rates) Untreated | After toluene exposure | Pressure resistance test |
|---|---|---|---|---|---|---|---|
| Comparative Example 3 | Composite membrane | c103 | P-108 | 25 | 16 | 8 | C |

Comparative Examples 1 and 2 are examples in which composite membranes were not used and the $CO_2$ permeation rate and the gas separation selectivity (ratio between gas permeation rates) were both inferior in these cases. Further, the asymmetric membrane of Comparative Example 1 was fractured when exposed to a high pressure condition and thus the mechanical strength was inferior.

Moreover, Comparative Example 3 is an example of a composite membrane using a polyimide resin other than the polyimide resin specified in the present invention. The $CO_2$ permeation rate was not sufficient and the gas separation selectivity was inferior.

Meanwhile, in the composite gas separation membranes of the present invention (Examples 1 to 7), the gas separation layer can be made thinner and thus the $CO_2$ permeability was excellent and the gas separation selectivity was improved. In addition, the membranes were unlikely to be affected by the toluene treatment and had excellent resistance to impurities. Further, the membranes were unlikely to be fractured when exposed to a high pressure condition and had excellent mechanical strength.

Explanation of References

1: gas separation layer
2: porous layer
3: non-woven fabric layer
10, 20: gas separation composite membrane The present invention has been described with reference to embodiments, but any detailed description of the invention is not intended to be limited unless otherwise specified. The appended claims should be broadly interpreted within the range not departing from the spirit and the scope of the invention.

What is claimed is:
1. A composite gas separation membrane comprising:
    a gas separation layer, which is formed to include a polyimide resin, on a support layer having gas permeability,
    wherein the polyimide resin includes a repeating unit represented by the following Formula (I) and a repeating unit represented by the following Formula (V),

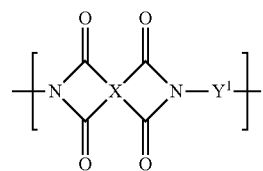

Formula (I)

in Formula (I), X represents a group having a structure represented by any of the following Formulae (I-a) to (I-h), $X^1$ represents a single bond or a divalent linking group, L represents —CH=CH— or —CH$_2$—, $R^1$ and $R^2$ represent a hydrogen atom or a substituent group, and the symbol "*" represents a binding site with respect to a carbonyl group in Formula (I),

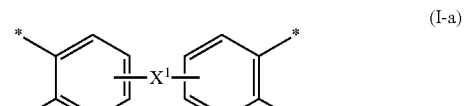 (I-a)

 (I-b)

 (I-c)

 (I-d)

 (I-e)

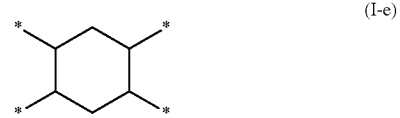 (I-f)

 (I-g)

 (I-h)

in Formula (I), $Y^1$ represents a group having a structure represented by the following Formula (II-a) or (II-b),

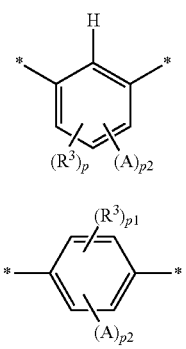

Formula (II-a)

Formula (II-b)

in Formulae (II-a) and (II-b), $R^3$ represents a substituent group, A represents a dissociable group, p represents 0 or 1, p1 represents an integer of 0 to 2, p2 represents an integer of 2 or greater, and the symbol "*" represents a connection site,

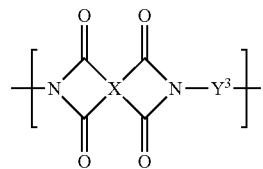

Formula (V)

in Formula (V), X has the same definition as that for X in Formula (I), and $Y^3$ represents a group having a structure represented by the following Formula (VI), and

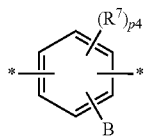

Formula (VI)

in Formula (VI), $R^7$ represents a substituent group, B represents a dissociable group, p4 represents an integer of 0 to 3, and the symbol "*" represents a connection site, wherein the dissociable group A in Formulae (II-a) and (II-b) and the dissociable group B in Formula (VI) are different from each other.

2. The composite gas separation membrane according to claim 1, wherein $Y^1$ is represented by Formula (II-b).

3. The composite gas separation membrane according to claim 1, wherein, when gas subjected to a separation treatment is mixed gas of carbon dioxide and methane, the permeation rate of carbon dioxide at 40° C. and 40 atm is greater than 20 GPU, and the ratio between permeation rates of carbon dioxide and methane ($R_{CO2}/R_{CH4}$) is 15 or greater.

4. The composite gas separation membrane according to claim 1, wherein the support layer is formed of a porous layer on a gas separation layer side and a non-woven fabric layer on a side opposite to the gas separation layer.

5. The composite gas separation membrane according to claim 4, wherein the cut-off molecular weight of the porous layer is 100000 or less.

6. The composite gas separation membrane according to claim 1, which is used to allow selective permeation of carbon dioxide from gas containing carbon dioxide and methane.

7. A gas separation module comprising the composite gas separation membrane according to claim 1.

8. A gas separation apparatus comprising the gas separation module according to claim 7.

9. A gas separation method comprising:

allowing carbon dioxide to selectively permeate from gas containing carbon dioxide and methane using the composite gas separation membrane according to claim 1.

* * * * *